United States Patent
Mao

(10) Patent No.: US 11,070,803 B2
(45) Date of Patent: Jul. 20, 2021

(54) METHOD AND APPARATUS FOR DETERMINING CODING COST OF CODING UNIT AND COMPUTER-READABLE STORAGE MEDIUM

(71) Applicant: TENCENT TECHNOLOGY (SHENZHEN) COMPANY LIMITED, Shenzhen (CN)

(72) Inventor: Xunan Mao, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 16/996,358

(22) Filed: Aug. 18, 2020

(65) Prior Publication Data
US 2020/0382778 A1 Dec. 3, 2020

Related U.S. Application Data
(63) Continuation of application No. PCT/CN2019/078300, filed on Mar. 15, 2019.

(30) Foreign Application Priority Data
Apr. 2, 2018 (CN) .......................... 201810287548.7

(51) Int. Cl.
*H04N 19/119* (2014.01)
*H04N 19/105* (2014.01)
(Continued)

(52) U.S. Cl.
CPC .......... *H04N 19/119* (2014.11); *G06F 17/18* (2013.01); *H04N 19/105* (2014.11);
(Continued)

(58) Field of Classification Search
USPC .................................................. 375/240.02
See application file for complete search history.

(56) References Cited

U.S. PATENT DOCUMENTS

2013/0083851 A1* 4/2013 Alshin ................ H04N 19/182
375/240.14
2013/0279568 A1* 10/2013 Matsunobu ............ H04N 19/86
375/240.03
(Continued)

FOREIGN PATENT DOCUMENTS

CN 104883566 9/2015
CN 105391999 3/2016
(Continued)

OTHER PUBLICATIONS

International Search Report dated Oct. 10, 2018 in PCT Application No. PCT/CN2019/078300 (with English Translation).
(Continued)

*Primary Examiner* — Behrooz M Senfi
(74) *Attorney, Agent, or Firm* — Oblon, McClelland, Maier & Neustadt, L.L.P.

(57) ABSTRACT

In a method for determining a coding cost of a coding unit (CU) that is performed by a server, a CU subject to predictive coding in an intra-frame prediction mode is determined. Pixel gradient information corresponding to the CU is performed. A division predecision on the CU is made according to the pixel gradient information. A first coding cost is determined as a second coding cost of the CU in a case that a result of the division predecision on the CU is negative. The second CU is used for determining a division policy of a coding tree unit (CTU) corresponding to the CU, and the first coding cost is a coding cost obtained by performing predictive coding on the CU by using a current size of the CU as a size of a prediction unit (PU).

20 Claims, 20 Drawing Sheets

(51) Int. Cl.
*H04N 19/159* (2014.01)
*H04N 19/169* (2014.01)
*G06F 17/18* (2006.01)
*H04N 19/96* (2014.01)

(52) U.S. Cl.
CPC ....... *H04N 19/159* (2014.11); *H04N 19/1883* (2014.11); *H04N 19/96* (2014.11)

(56) References Cited

U.S. PATENT DOCUMENTS

| | | | | |
|---|---|---|---|---|
| 2015/0055698 | A1* | 2/2015 | Na | H04N 19/172 375/240.02 |
| 2015/0350671 | A1* | 12/2015 | Alshin | H04N 19/187 375/240.15 |
| 2017/0041616 | A1 | 2/2017 | Ramamurthy et al. | |

FOREIGN PATENT DOCUMENTS

| | | |
|---|---|---|
| CN | 107071418 | 8/2017 |
| CN | 107105297 | 8/2017 |
| CN | 104539949 | 2/2018 |

OTHER PUBLICATIONS

Written Opinion dated Oct. 10, 2018 in PCT Application No. PCT/CN2019/078300.
Xiabai Cai et al. "Fast Coding Tree Unit Decision for HEVC Intracoding", ICCE China Workshop (ICCE-China), Apr. 30, 2013 (English Abstract only).
Extended European Search Report dated Apr. 29, 2021 in European Application No. 19782198.6.
Communication Pursuant to Rules 70(2) and 70a(2) EPC dated May 19, 2021 in European Application No. 19782198.6.
Satish Lokkoju et al. "Fast Coding Unit Partition Search", 2012 IEEE International Symposium on Signal Processing and Information Technology (ISSPIT), Dec. 12, 20212, XP032496073, pp. 315-319.
Andrzej Abramowski "A Survey Over Possible Intra Prediction Optimizations in the H.265/HEVC Encoder". Proceedings of SPIE, vol. 10031, Sep. 28, 2016. XP060073637. pp. 1003153-1-1003153-13.
Mohammadreza Jamali et al. "Coding Unit Splitting Early Termination for Fast HEVC Intra Coding Based on Global and Directional Gradients", 2016 IEEE 18th International Workshop on Multimedia Signal Processing (MMSP), Sep. 21, 2016. XP033041366. 5 pages.

* cited by examiner

METHOD AND APPARATUS FOR DETERMINING CODING COST OF CODING UNIT AND COMPUTER-READABLE STORAGE MEDIUM

RELATED APPLICATION

This application is a continuation of International Application No. PCT/CN2019/78300, filed Mar. 15, 2019, which claims priority to Chinese Patent Application No. 201810287548.7, entitled "METHOD FOR DETERMINING CODING COST OF CODING UNIT AND RELATED APPARATUS", and filed Apr. 2, 2018. The entire disclosures of the prior applications are hereby incorporated by reference.

FIELD OF THE TECHNOLOGY

The present disclosure relates to the determination of a coding cost of a coding unit (CU) in video encoding.

BACKGROUND OF THE DISCLOSURE

High efficiency video coding (HEVC) is a new-generation efficient video coding standard jointly formulated by the International Telecommunications Union-Telecommunication Standardization Sector (ITU-T) and the International Standard Organized (ISO), which may also be referred to as H.265. Compared with the H.264/advanced video coding (AVC) standard, HEVC adopts more coding technologies that are newer and more flexible. Under the same video quality condition, HEVC may further reduce a bit rate of coding.

The HEVC standard reuses a block-based video compression coding framework in the H.264/AVC standard, and adopts a block structure that is more flexible than a macroblock (MB) used in the H.264/AVC. In the H.264/AVC standard, the MB has a fixed size of 16*16 pixels, while in the HEVC standard, a CU may have four sizes: 64*64 pixels, 32*32 pixels, 16*16 pixels, and 8*8 pixels. In the HEVC standard, a specific size of the CU is determined through a CU algorithm of a tree structure, to divide a frame of image, which is specifically as follows. First, the frame of image is divided into a plurality of coding tree units (CTUs). Then, for each CTU, CUs are traversed layer by layer in a Z shape through traversal and recursion, to determine a coding cost of each CU. A division policy that can minimize a coding cost corresponding to coding of the CTU is determined according to the coding cost of each CU. Division of the CTU is determined according to the division policy. In this way, division of the CU is implemented. For each CU in the tree structure, predictive coding needs to be performed and coding cost calculation and other calculation need to be performed to determine the coding cost of the CU and determine whether the CU needs to be divided. Therefore, the algorithm requires a large amount of calculation, which takes much time, and causes a low coding rate.

SUMMARY

According to exemplary aspects, in a method for determining a coding cost of a coding unit (CU), performed by a server, a CU subject to predictive coding in an intra-frame prediction mode is determined, and pixel gradient information corresponding to the CU is determined. The pixel gradient information includes a pixel gradient variance, and the pixel gradient variance is a variance of image gradients of at least some pixels in the CU. A division predecision on the CU is made according to the pixel gradient information, and a first coding cost is determined as a second coding cost of the CU in a case that a result of the division predecision on the CU is negative. The second CU is used for determining a division policy of a coding tree unit (CTU) corresponding to the CU, and the first coding cost is a coding cost obtained by performing predictive coding on the CU by using a current size of the CU as a size of a prediction unit (PU).

According to exemplary aspects, the CU is divided into at least two sub-CUs in a case that the result of the division predecision on the CU is positive, and, by using each of the at least two sub-CUs as a new CU subject to predictive coding in the intra-frame prediction mode, the method for determining a coding cost of a CU is performed to determine a coding cost of each of the at least two sub-CUs. The first coding cost is determined as the second coding cost of the CU in a case that a sum of coding costs of the at least two sub-CUs is greater than or equal to the first coding cost, and the sum of the coding costs of the at least two sub-CUs is determined as the second coding cost of the CU in a case that the sum of the coding costs of the at least two sub-CUs is less than the first coding cost.

In exemplary aspects, in the making of a division predecision, a variance threshold corresponding to the CU is determined. A result of the division predecision on the CU is determined to be negative in a case that the pixel gradient variance is less than the variance threshold, and the result of the division predecision on the CU is determined to be positive in a case that the pixel gradient variance is greater than or equal to the variance threshold.

In exemplary aspects, the pixel gradient information further comprises a pixel gradient average value, and the pixel gradient average value is an average value of the image gradients of the at least some pixels in the CU. In the making of a division predecision on the CU, a first threshold corresponding to the CU, a second threshold corresponding to the CU, and a variance threshold corresponding to the CU are determined. The second threshold is greater than the first threshold. A result of the division predecision on the CU is determined to be negative in a case that the pixel gradient average value is less than the first threshold, or the result of the division predecision on the CU is determined to be negative in a case that the pixel gradient average value is greater than or equal to the first threshold, the pixel gradient average value is less than the second threshold, and the pixel gradient variance is less than the variance threshold. The result of the division predecision on the CU is determined to be positive in a case that the pixel gradient average value is greater than or equal to the first threshold, the pixel gradient average value is less than the second threshold, and the pixel gradient variance is greater than or equal to the variance threshold, or the result of the division predecision on the CU is determined to be positive in a case that the pixel gradient average value is greater than or equal to the second threshold.

In exemplary aspects, in the determining a first threshold, a plurality of neighboring CUs of the CU is determined. An edge of a neighboring CU coincides with an edge of the CU or a vertex of the neighboring CU coincides with a vertex of the CU, and an image in the neighboring CU does not coincide with an image in the CU. The first threshold corresponding to the CU is determined according to a size of a first neighboring CU and a pixel gradient average value corresponding to the first neighboring CU in a case that a quantity of first neighboring CUs in the plurality of neighboring CUs is greater than or equal to a target quantity. The first neighboring CU is subject to predictive coding in the intra-frame prediction mode. An average threshold corresponding to a size of the CU is determined as the first threshold corresponding to the CU in a case that the quantity of the first neighboring CUs in the plurality of neighboring CUs is less than the target quantity.

In exemplary aspects, in the determining the first threshold corresponding to the CU according to a size of a first neighboring CU and a pixel gradient average value corresponding to the first neighboring CU, the first neighboring CUs is searched for a second neighboring CU. A size of the second neighboring CU is greater than or equal to the size of the CU. A product of a first coefficient and a target average value is determined as the first threshold corresponding to the CU in a case that there is the second neighboring CU. The target average value is a quotient of a sum of pixel gradient average values of second neighboring CUs and a quantity of the second neighboring CUs. The first threshold corresponding to the CU is determined to be 0 in a case that there is no second neighboring CU.

In exemplary aspects, the second threshold corresponding to the CU is a product of the first threshold corresponding to the CU and a second coefficient.

In exemplary aspects, the variance threshold corresponding to the CU is in a positive correlation with a quantization parameter corresponding to the CU.

In exemplary aspects, an apparatus for determining a coding cost of a coding unit (CU) includes circuitry that determines a CU subject to predictive coding in an intra-frame prediction mode. The circuitry determines pixel gradient information corresponding to the CU. The pixel gradient information includes a pixel gradient variance, and the pixel gradient variance is a variance of image gradients of at least some pixels in the CU. The circuitry makes a division predecision on the CU according to the pixel gradient information, and determines a first coding cost as a second coding cost of the CU in a case that a result of the division predecision made on the CU by the predecision module is negative. The second coding cost is used for determining a division policy of a coding tree unit (CTU) corresponding to the CU, and the first coding cost is a coding cost obtained by performing predictive coding on the CU by using a current size of the CU as a size of a prediction unit (PU).

In exemplary aspects, the circuitry divides the CU into at least two sub-CUs in a case that the result of the division predecision made on the CU by the predecision module is positive, and uses each of the at least two sub-CUs as a new CU subject to predictive coding in the intra-frame prediction mode. The circuitry determines pixel gradient information corresponding to each of the at least two sub-CUs, makes a division predecision on each of the at least two sub-CUs according to the pixel gradient information, and determines a coding cost of each of the at least two sub-CUs. The circuitry determines the first coding cost as the second coding cost of the CU in a case that a sum of coding costs of the at least two sub-CUs is greater than or equal to the first coding cost, and determines the sum of the coding costs of the at least two sub-CUs as the second coding cost of the CU in a case that the sum of the coding costs of the at least two sub-CUs is less than the first coding cost.

In exemplary aspects, the circuitry determines a variance threshold corresponding to the CU. The circuitry determines that a result of the division predecision on the CU is negative in a case that the pixel gradient variance is less than the variance threshold, and determines that the result of the division predecision on the CU is positive in a case that the pixel gradient variance is greater than or equal to the variance threshold.

In exemplary aspects, the pixel gradient information further comprises a pixel gradient average value, and the pixel gradient average value is an average value of the image gradients of the at least some pixels in the CU. The circuitry determines a first threshold corresponding to the CU, a second threshold corresponding to the CU, and a variance threshold corresponding to the CU, the second threshold being greater than the first threshold.

In exemplary aspects, the circuitry determines that a result of the division predecision on the CU is negative in a case that the pixel gradient average value is less than the first threshold.

In exemplary aspects, the circuitry determines that a result of the division predecision on the CU is negative in a case that the pixel gradient average value is greater than or equal to the first threshold, the pixel gradient average value is less than the second threshold, and the pixel gradient variance is less than the variance threshold.

In exemplary aspects, the circuitry determines that the result of the division predecision on the CU is positive in a case that the pixel gradient average value is greater than or equal to the first threshold, the pixel gradient average value is less than the second threshold, and the pixel gradient variance is greater than or equal to the variance threshold.

In exemplary aspects, the circuitry determines that the result of the division predecision on the CU is positive in a case that the pixel gradient average value is greater than or equal to the second threshold.

In exemplary aspects, the circuitry determines a plurality of neighboring CUs of the CU. An edge of the neighboring CU coincides with an edge of the CU or a vertex of the neighboring CU coincides with a vertex of the CU, and an image in the neighboring CU does not coincide with an image in the CU. The circuitry determines the first threshold corresponding to the CU according to a size of a first neighboring CU and a pixel gradient average value corresponding to the first neighboring CU in a case that a quantity of first neighboring CUs in the plurality of neighboring CUs is greater than or equal to a target quantity. The first neighboring CU is subject to predictive coding in the intra-frame prediction mode. The circuitry determines an average threshold corresponding to a size of the CU as the first threshold corresponding to the CU in a case that the quantity of the first neighboring CUs in the plurality of neighboring CUs is less than the target quantity.

In exemplary aspects, a non-transitory computer-readable medium is encoded with computer-readable instructions that, when executed by a processor, cause the processor to perform a method in which a coding unit (CU) subject to predictive coding in an intra-frame prediction mode is determined. Pixel gradient information corresponding to the CU is determined. The pixel gradient information includes a pixel gradient variance, and the pixel gradient variance is a variance of image gradients of at least some pixels in the CU. A division predecision on the CU is made according to the pixel gradient information. A first coding cost as a second coding cost of the CU in a case that a result of the division predecision on the CU is negative, the second CU being used for determining a division policy of a coding tree unit (CTU) corresponding to the CU, and the first coding cost being a coding cost obtained by performing predictive coding on the CU by using a current size of the CU as a size of a prediction unit (PU).

In exemplary aspects, the CU is divided into at least two sub-CUs in a case that the result of the division predecision on the CU is positive, and, by using each of the at least two sub-CUs as a new CU subject to predictive coding in the intra-frame prediction mode, the method for determining a coding cost of a CU is performed to determine a coding cost of each of the at least two sub-CUs. The first coding cost is determined as the second coding cost of the CU in a case that a sum of coding costs of the at least two sub-CUs is greater than or equal to the first coding cost, and the sum of the coding costs of the at least two sub-CUs is determined as the second coding cost of the CU in a case that the sum of the coding costs of the at least two sub-CUs is less than the first coding cost.

In exemplary aspects, a variance threshold corresponding to the CU is determined. A result of the division predecision on the CU is determined to be negative in a case that the pixel gradient variance is less than the variance threshold, and the result of the division predecision on the CU is determined to be positive in a case that the pixel gradient variance is greater than or equal to the variance threshold.

BRIEF DESCRIPTION OF THE DRAWINGS

The following is a brief description of the drawings that are used to describe the exemplary embodiments of the present disclosure in detail. As can be appreciated, the accompanying drawings are merely exemplary and other details not illustrated therein are possible without departing from the scope of the present disclosure.

DETAILED DESCRIPTION

The following describes exemplary embodiments of the present disclosure with reference to the accompanying drawings. As can be appreciated, these embodiments are merely examples, and other embodiments are possible without departing from the scope of the present disclosure.

Before describing the exemplary embodiments of the present disclosure, the following definitions are provided to aid in the understanding of the concepts described herein. These definitions may, in some cases, pertain to the HEVC standard as well as the exemplary embodiments.

Figure 1:
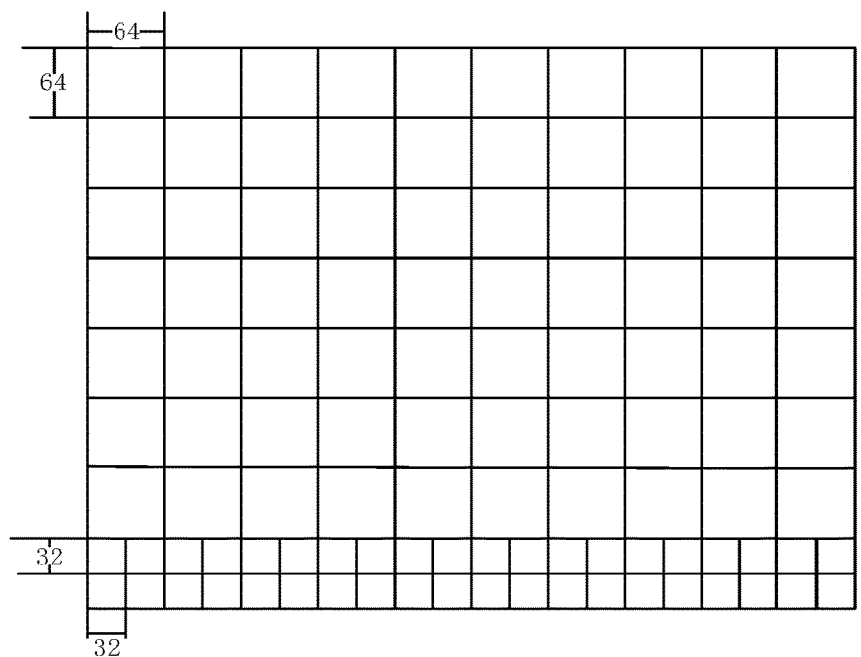
FIG. 1 is a schematic diagram of dividing a frame of image into a plurality of CTUs according to an exemplary embodiment of the present disclosure.

1. CTU. The CTU is a base unit when a frame of image is divided. Before the frame of image is coded, it is required to divide the frame of image, and in an image division process, the image is first divided into a plurality of CTUs. Generally, a size of the CTU is 64*64 pixels. Optionally, the size of the CTU may be 32*32 pixels, or may be 16*16 pixels or 8*8 pixels. For example, for an I frame of image with 640*480 pixels, as shown in FIG. 1, after the frame of image is divided into 70 CTUs with 64*64 pixels, a remaining image is not sufficient to be divided into CTUs with 64*64 pixels, and therefore the remaining image is divided into 20 CTUs with 32*32 pixels.

2. CU. The CU is a CU in the HEVC standard and similar to an MB in the H.264/AVC standard in concept. When video coding is performed on a specific frame of image, all CUs in the frame of image are coded one by one to form a coherent video stream. The CU is obtained by dividing a CTU, and a size of the CU is less than or equal to a size of the CTU. When a division status of each CTU in an image is determined, a division status of an entire frame of image may be determined.

Figure 2A:
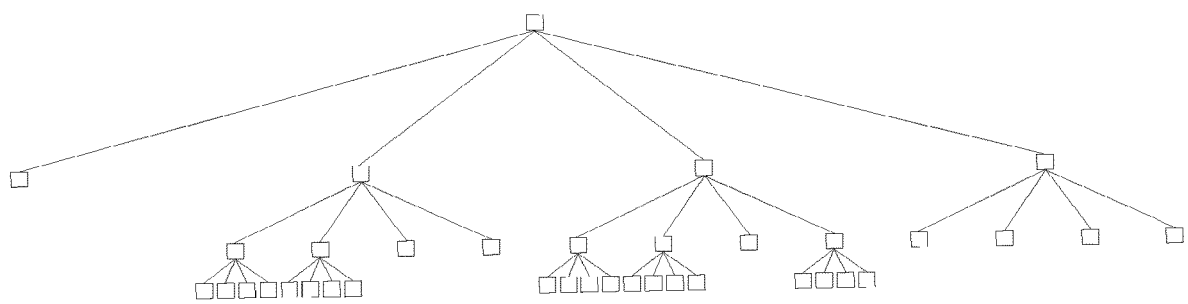
FIG. 2A is a schematic diagram of a representation of a division policy of a CTU according to an exemplary embodiment of the present disclosure.
Figure 2B:
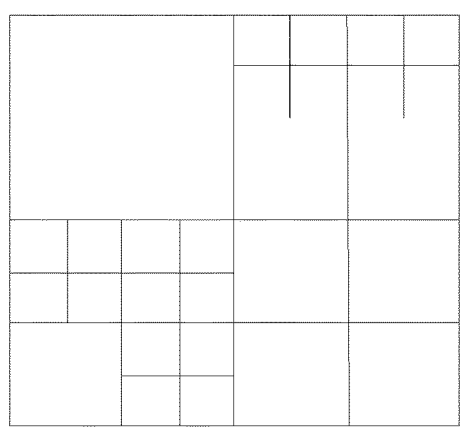
FIG. 2B is schematic diagram of another representation of a division policy of a CTU according to an exemplary embodiment of the present disclosure.

After the CTU is divided according to a division policy corresponding to the CTU, a division status of the CU in the CTU may be determined. The division policy corresponding to the CTU may be represented by a tree structure, and the division status of the CU of the CTU may be determined according to the tree structure. For example, as shown in FIG. 2A, the division policy of the CTU is represented by a tree structure, a root node in the tree structure represents the CTU, and a leaf node in the tree structure represents a CU in the CTU. If there is a subnode under a node in the tree structure, it indicates that a CU corresponding to the node needs to be further divided. If there is no subnode under the node in the tree structure, it indicates that the node does not need to be further divided. FIG. 2B shows a division status of the CU in the CTU determined according to the tree structure shown in FIG. 2A.

If predictive coding is performed on the CTU in an intra-frame prediction mode, the division policy of the CTU may be determined by using a complete traversal and recursion coding algorithm. FIG. 3A to FIG. 3E are schematic diagrams of the algorithm. That a size of the CTU is 64*64 pixels is used as an example.

Figure 3A:
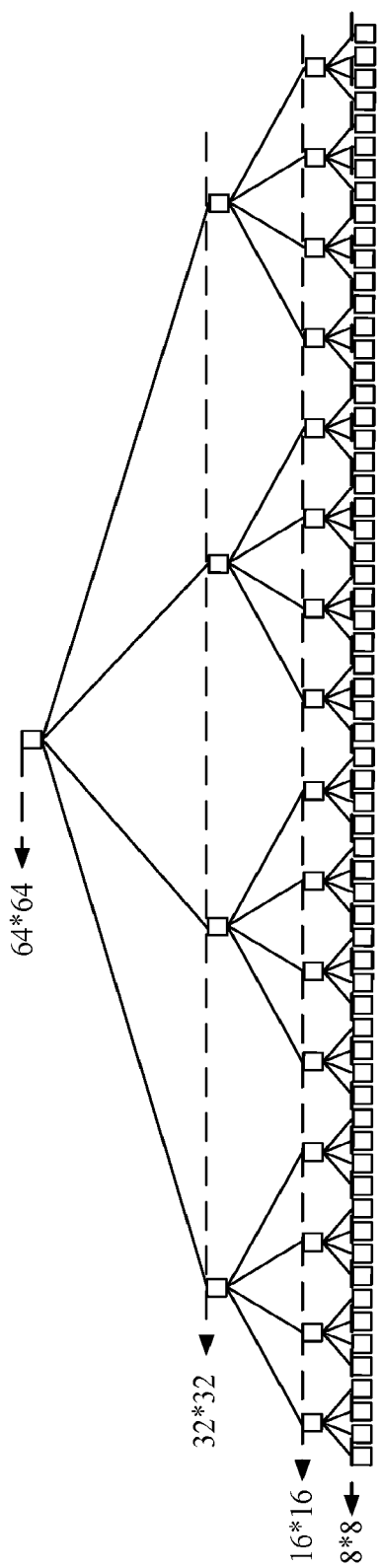
FIG. 3A is a flowchart for determining a division policy of a CTU using a complete traversal and recursion algorithm according to an exemplary embodiment of the present disclosure.
Figure 3B:
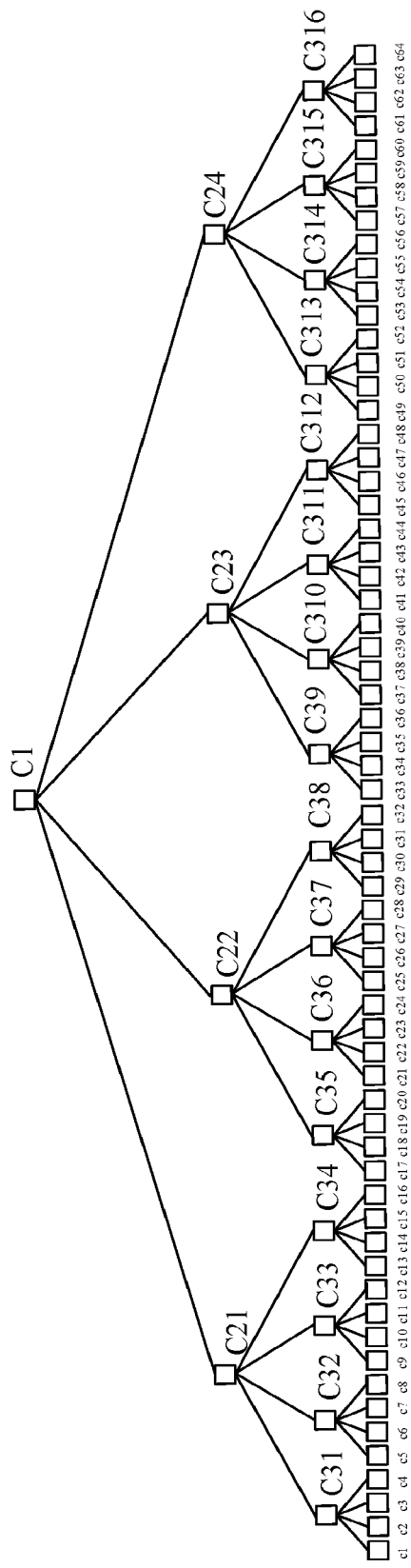
FIG. 3B is another flowchart for determining a division policy of a CTU using a complete traversal and recursion algorithm according to an exemplary embodiment of the present disclosure.

A traversal process may be shown in FIG. 3A and FIG. 3B. First, as shown in FIG. 3A, a CTU with a size of 64*64 pixels is divided into four CUs with 32*32 pixels as sub-CUs of the CTU. Each CU with 32*32 pixels is further divided into four CUs with 16*16 pixels as sub-CUs of the CU with 32*32 pixels. Each CU with 16*16 pixels is further divided into four CUs with 8*8 pixels as sub-CUs of the CU with 16*16 pixels. Four layers of CUs form a full quadtree (except the last layer without any subnodes, all nodes on each layer have four subnodes).

After the full quadtree is formed, as shown in FIG. 3B, predictive coding is performed on the CTU by using 64*64 pixels as a size of a PU to determine an optimal prediction mode, and determine a coding cost (C1) of the CTU in the optimal prediction mode. The coding cost is a minimum coding cost of the CTU in a PU division manner of 2N*2N. Predictive coding is performed on each CU of the second layer by using 32*32 pixels as a size of a PU to determine an optimal prediction mode of each CU of the second layer, and determine a coding cost (C21, C22, C23, and C24) of each CU of the second layer in the optimal prediction mode. The coding cost is a minimum coding cost of each CU of the second layer in the PU division manner of 2N*2N. Predictive coding is performed on each CU of the third layer by using 16*16 pixels as a size of a PU to determine an optimal prediction mode of each CU of the third layer, and determine a coding cost (C31, . . . , C34; C35, . . . , C38; C39, . . . , C312; and C313, . . . , C316) of each CU of the third layer in the optimal prediction mode. The coding cost is a minimum coding cost of each CU of the third layer in the PU division manner of 2N*2N. Predictive coding is performed on each CU of the fourth layer by using 8*8 pixels as a size of a PU to determine an optimal prediction mode of each CU of the fourth layer, and determine a coding cost ($c_1$, . . . , $c_4$, $c_5$, . . . , $c_6$, $c_{57}$, . . . , $c_{60}$, $c_{61}$, $c_{64}$) of each CU of the fourth layer in the optimal prediction mode. The coding cost is a minimum coding cost of each CU of the fourth layer in the PU division manner of 2N*2N.

The optimal prediction mode is a prediction mode that can minimize a coding cost obtained by performing predictive coding on a CU in a plurality of prediction modes corresponding to a PU with a specific size. For example, if a PU with a size of 64*64 pixels corresponds to four prediction modes, coding costs obtained by performing predictive coding on the CU by using the four prediction modes are $c_1$, $c_2$, $c_3$, and $c_4$, and $c_1 < c_2 < c_3 < c_4$, a prediction mode corresponding to $c_1$ is an optimal prediction mode.

The coding cost may also be referred to as a rate distortion cost, which is used for indicating a difference between a reference value and a predicted value obtained through prediction when predictive coding is performed on the CU in a specific prediction mode. A smaller coding cost indicates a smaller difference between the predicted value and the reference value, fewer bits required for coding, and a lower bit rate. In specific implementation, a coding cost obtained by performing predictive coding on a CU in a specific prediction mode may be determined by using an algorithm such as a sum of absolute difference (SAD) algorithm, a sum of absolute transformed difference (SATD) algorithm, or a sum of squared difference (SSD) algorithm.

Figure 3C:
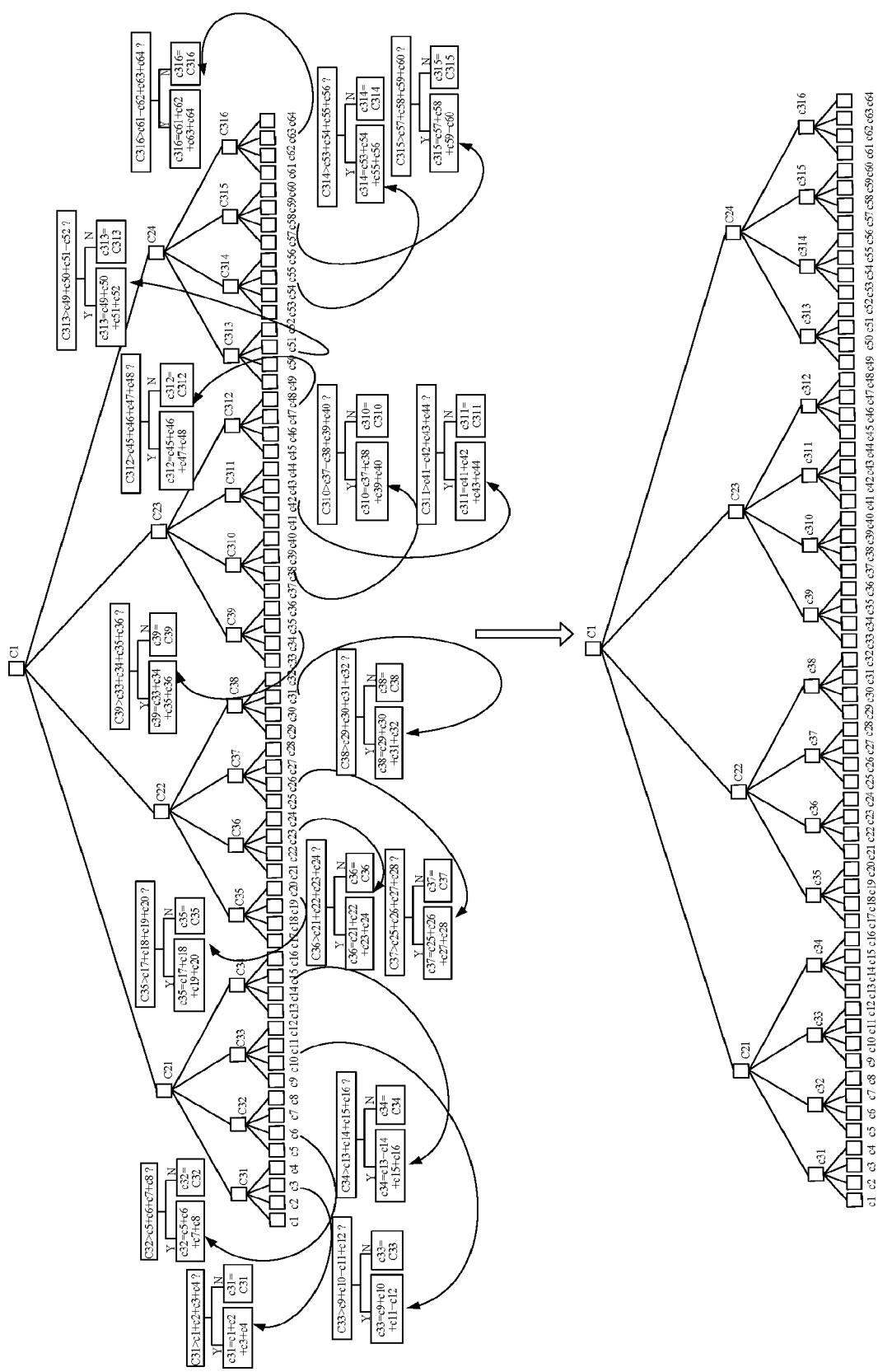
FIG. 3C is another flowchart for determining a division policy of a CTU using a complete traversal and recursion algorithm according to an exemplary embodiment of the present disclosure.
Figure 3D:
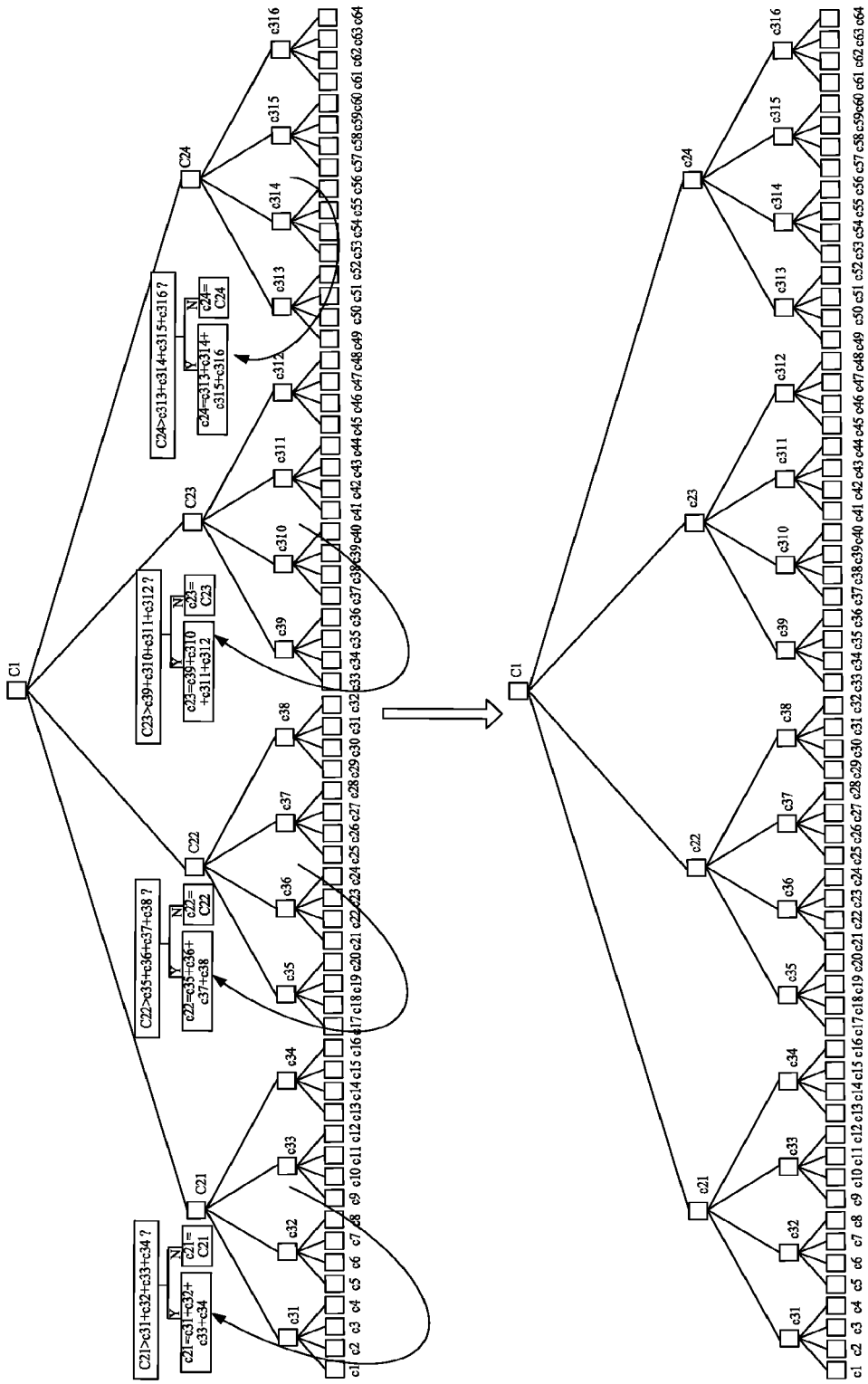
FIG. 3D is another flowchart for determining a division policy of a CTU using a complete traversal and recursion algorithm according to an exemplary embodiment of the present disclosure
Figure 3E:
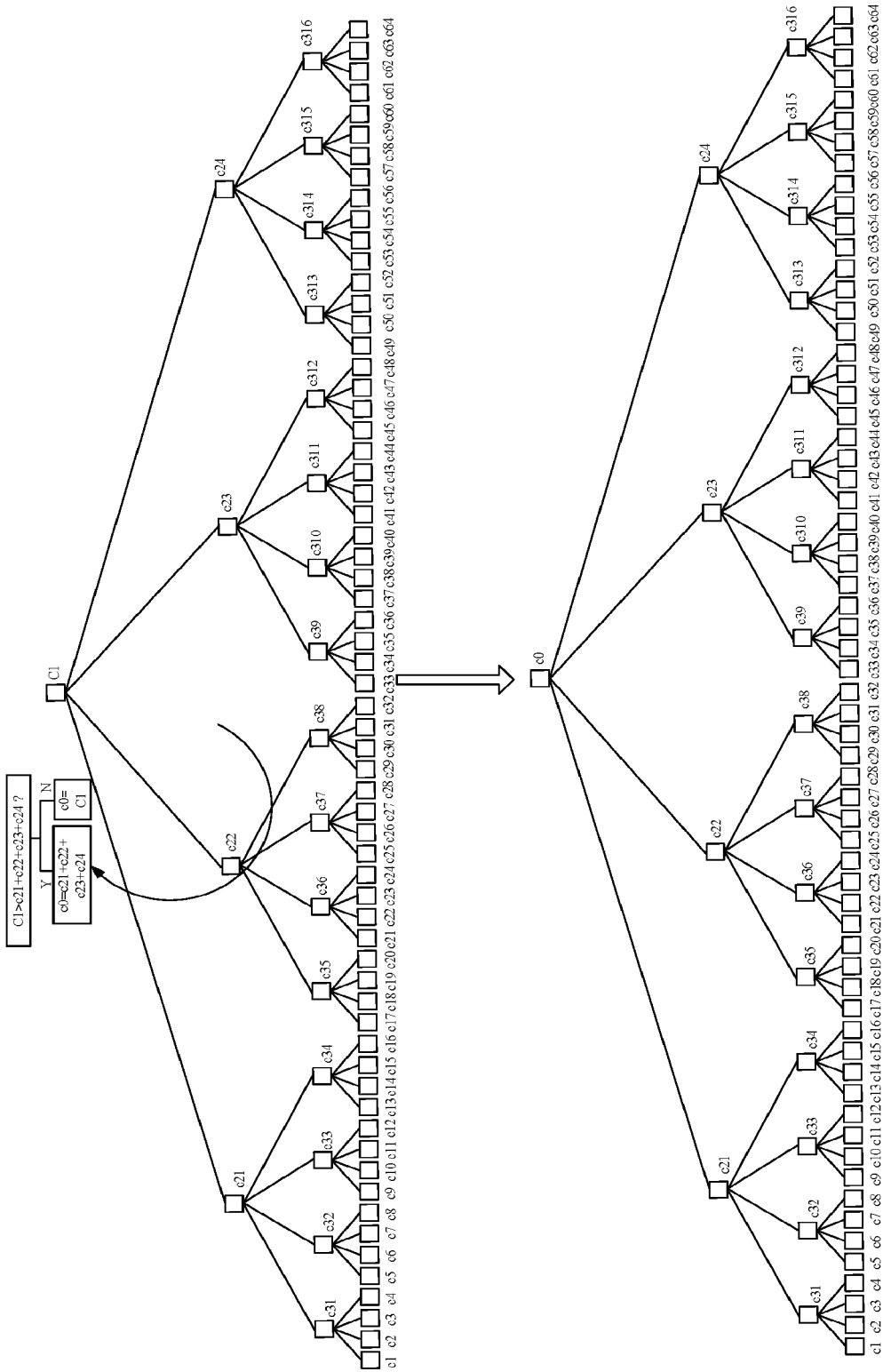
FIG. 3E is another flowchart for determining a division policy of a CTU using a complete traversal and recursion algorithm according to an exemplary embodiment of the present disclosure.

A recursion process is performed after the traversal process. The recursion process is shown in FIG. 3C, FIG. 3D, and FIG. 3E. First, as shown in FIG. 3C, minimum coding costs (for example, $c_1$, $c_2$, $c_3$, and $c_4$) of four sub-CUs of each CU of the third layer are added up to obtain another coding cost of each CU of the third layer, which is a minimum coding cost of each CU of the third layer in a PU division manner of N*N. The minimum coding cost of each CU of the third layer in the PU division manner of 2N*2N is compared with the minimum coding cost in the PU division manner of N*N (for example, C31 is compared with $c_1+c_2+c_3+c_4$), and a smaller one of the two minimum coding costs is selected as a minimum coding cost of each CU of the third layer, which is a final coding cost ($c_{31}$, $c_{32}$, . . . , $c_{316}$) of each CU of the third layer.

Then, as shown in FIG. 3D, minimum coding costs (for example, $c_{31}$, $c_{32}$, $c_{33}$, and $c_{34}$) of four sub-CUs of each CU of the second layer are added up to obtain another coding cost of each CU of the second layer, which is a minimum coding cost of each CU of the second layer in the PU division manner of N*N. The minimum coding cost of each CU of the second layer in the PU division manner of 2N*2N is compared with the minimum coding cost in the PU division manner of N*N (for example, C21 is compared with $c_{31}+c_{32}+c_{33}+c_{34}$), and a smaller one of the two minimum coding costs is selected as a minimum coding cost of each CU of the second layer, which is a final coding cost of each CU of the second layer ($c_{21}$, $c_{22}$, $c_{23}$, and $c_{24}$).

Next, as shown in FIG. 3E, minimum coding costs (for example, $c_{21}$, $c_{22}$, $c_{23}$, and $c_{24}$) of four CUs under the CTU of the first layer are added up to obtain another coding cost of the CTU, which is a minimum coding cost of the CTU in the PU division manner of N*N. The minimum coding cost (C1) of the CTU in the PU division manner of 2N*2N is compared with the minimum coding cost ($c_{21}+c_{22}+c_{23}+c_{24}$) in the PU division manner of N*N, and a smaller one of the two minimum coding costs is selected as a minimum coding cost ($c_0$) of the CTU, which is a final coding cost of the CTU.

Figure 4:
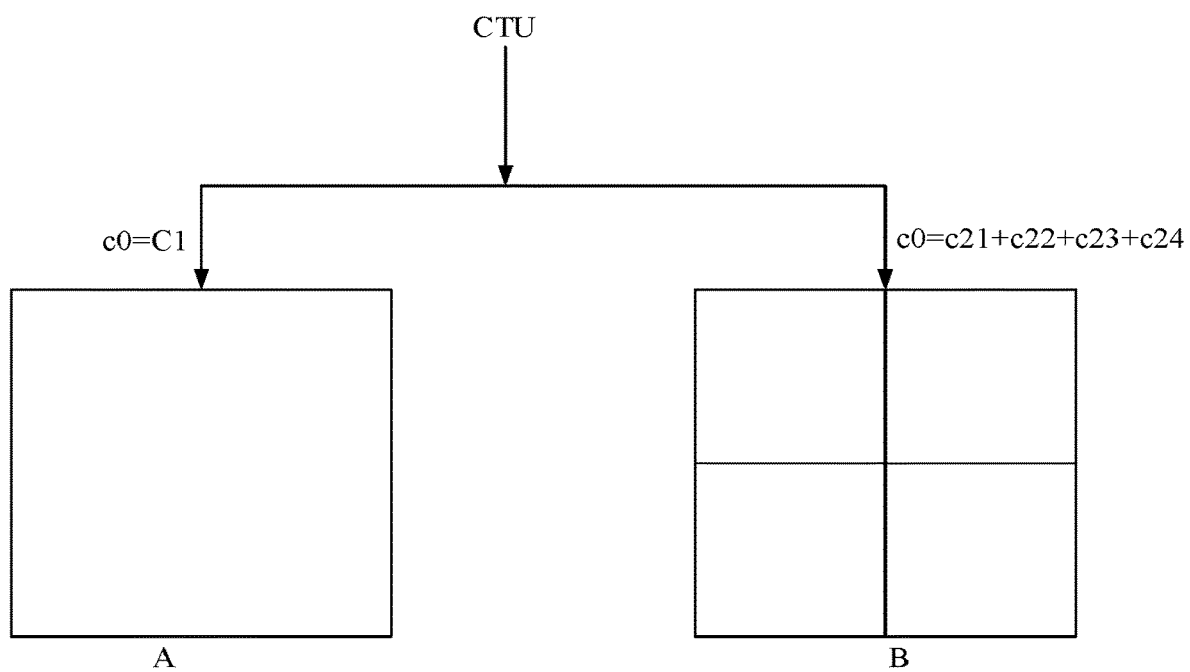
FIG. 4 is a schematic diagram for determining a division manner of a CTU according to a final coding cost of the CTU according to an exemplary embodiment of the present disclosure.

After the recursion process, a division manner of the CTU may be determined according to the minimum coding cost of the CU of each layer. If the minimum coding cost of the CTU is the minimum coding cost in the PU division manner of 2N*2N (c0=C1), it is determined that the CTU is not divided and the tree structure of the CTU has only one layer, that is, the root node. A corresponding division status is shown in A of FIG. 4. If the minimum coding cost of the CTU is the minimum coding cost in the PU division manner of N*N (c0=c21+c22+c23+c24), it is determined that the CTU needs to be divided into four CUs, as shown in B of FIG. 4. Then, whether each CU of the second layer needs to be divided is determined in sequence according to the minimum coding cost of each CU of the second layer. If the minimum coding cost is the minimum coding cost in the PU division manner of 2N*2N, each CU of the second layer does not need to be divided. If the minimum coding cost is the minimum coding cost in the PU division manner of N*N, each CU of the second layer needs to be divided. Similarly, whether each CU of the third layer needs to be divided is determined in sequence according to the minimum coding cost of each CU of the third layer. A division status of each CU may be represented by the tree structure shown in FIG. 2A.

As can be appreciated from FIG. 3A to FIG. 3E, a process of the complete traversal and recursion algorithm is a process of finding a division policy that can minimize the coding cost of the CTU. The final coding cost of each CU determined by using the recursion process is used for determining the division policy, the CTU may be divided according to the division policy, and the CTU may be coded according to CUs obtained by dividing the CTU.

3. PU. The PU is a base unit used in performing predictive coding on a CU. There are different PU division manners for different prediction modes. For example, for an intra-frame prediction mode, there are two PU division manners: 2N*2N and N*N. The 2N*2N manner refers to dividing the CU into one PU for predictive coding, that is, one CU includes one PU. The N*N manner refers to dividing the CU into four PUs with the same size for predictive coding, that is, one CU includes four PUs.

As can be appreciated from FIG. 3A to FIG. 3E, the division policy determined according to the coding algorithm of the tree structure may minimize the coding cost of the CTU, that is, the CTU may be coded by using minimum bits to reduce a bit rate. Although the bit rate is reduced, an involved calculation process is complex. Specifically, in the calculation process, costs of each CU in the full quadtree are calculated in different PU division manners and different prediction modes, and a plurality of coding costs obtained through calculation are compared to obtain a minimum coding cost of each CU. This may require a large amount of calculation, and has high complexity, which takes much time and causes a low coding speed.

Therefore, the exemplary embodiments of the present disclosure provide a method for determining a coding cost of a CU and a related apparatus, to resolve a problem of high calculation complexity in a process of determining a division policy of a CTU.

Figure 5:
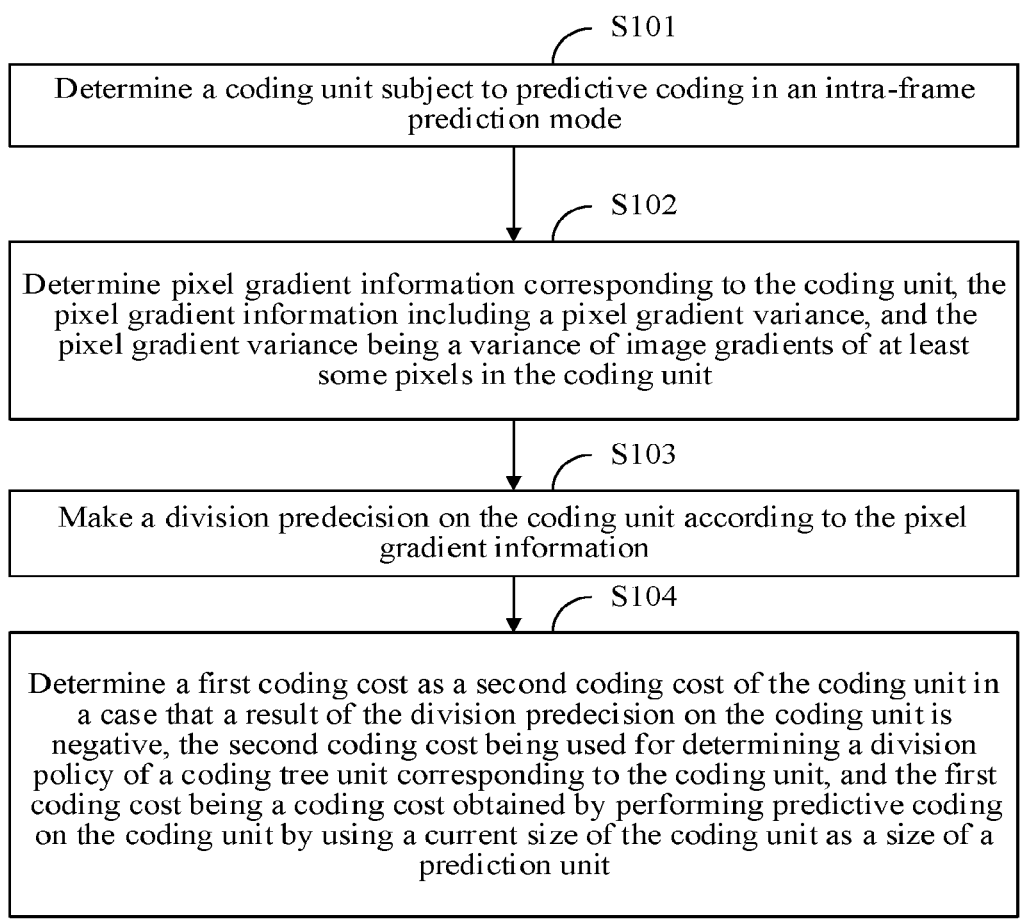
FIG. 5 is a flowchart of a method for determining a coding cost of a CU according to an exemplary embodiment of the present disclosure.

The method for determining a coding cost of a CU provided in the exemplary embodiments of the present disclosure is described in detail below with reference to FIG. 5 to FIG. 12. For example, FIG. 5 is a flowchart of a method for determining a coding cost of a CU according to an exemplary embodiment. The method may be performed by a video coding server, or may be performed by other devices as one of ordinary skill would recognize. As shown in FIG. 5, the method may include steps S101 to S104.

In step S101, a CU subject to predictive coding in an intra-frame prediction mode is determined. The CU is obtained by dividing a CTU, and a size of the CU may be any one of 8*8 pixels, 16*16 pixels, 32*32 pixels, and 64*64 pixels. The predictive coding in the intra-frame prediction mode refers to performing predictive coding by using a CU of a current frame as a reference CU, and the reference CU refers to a CU that has been coded. However, other references may be used without departing from the scope of the present disclosure.

If the CU is a CU in an I frame, because only intra-frame predictive coding is adopted for the I frame, the CU may be directly determined as a CU subject to predictive coding in the intra-frame prediction mode. If the CU is a CU in a non-I frame (for example, a P frame or a B frame), the CU subject to predictive coding in the intra-frame prediction mode may be determined with reference to an intra-frame mode decision algorithm in the H.264/AVC standard, in which after inter-frame predictive coding is performed on the CU and an optimal inter-frame mode is selected, an average bit rate of the CU and an average boundary error of the CU are determined. If the average bit rate of the CU is greater than or equal to the average boundary error of the CU, it is determined that the CU is a CU subject to predictive coding in the intra-frame prediction mode. If the CU is the CU in the non-I frame, the CU subject to predictive coding in the intra-frame prediction mode may alternatively be determined in other manners without limitation.

If a size of the CU is equal to a size of a small CU (SCU), that is, 8*8 pixels, and the CU cannot be further divided, step S104 is performed without step S102 and step S103, that is, a first coding cost is determined as a second coding cost of the CU. Otherwise, steps S102 and S103 are performed as described below.

In step S102, pixel gradient information corresponding to the CU is determined. The pixel gradient information includes a pixel gradient variance, and the pixel gradient variance is a variance of image gradients of at least some pixels in the CU. In exemplary embodiments, the pixel gradient information corresponding to the CU is information obtained according to an image gradient of a pixel in the CU. The pixel gradient information may be information obtained according to image gradients of some or all pixels in the CU.

In addition to the pixel gradient variance, the pixel gradient information may further include parameters, for example, a pixel gradient average value and a pixel gradient mean variance, used for measuring smoothness and texture complexity of an image. The pixel gradient average value refers to an average value of the image gradients of some or all the pixels in the CU. The pixel gradient mean variance refers to a mean variance of the image gradients of some or all the pixels in the CU.

In exemplary embodiments, pixel gradient information of each pixel in the CU may be determined by using an image gradient algorithm, to determine image gradients of some or all pixels in the CU, and the pixel gradient information corresponding to the CU may be further determined according to the image gradients of some or all the pixels in the CU. The image gradient algorithm may be an image gradient algorithm based on a first derivative, for example, a Roberts operator, a Sobel operator, or a Prewitt operator. Alternatively, the image gradient algorithm may be an image gradient algorithm based on a second derivative, for example, a Laplace operator.

In exemplary embodiments, if the pixel gradient information is the information obtained according to the image gradients of some pixels in the CU, the pixels may be some pixels selected randomly from all the pixels in the CU. Alternatively, the pixels may be some pixels selected from all the pixels in the CU according to a specific selecting rule, for example, may be some pixels selected according to a preset sampling rate. For example, the preset sampling rate is 90%, the size of the CU is 64*64 pixels, that is, 4096 pixels, and some pixels in the CU are 3687 pixels in the 4096 pixels. All the pixels in the CU may be sampled from left to right and from top to bottom to obtain the 3687 pixels.

In step S103, a division predecision is made regarding the CU according to the pixel gradient information. If the pixel gradient information is the pixel gradient variance, the division predecision may be made on the CU according to the pixel gradient variance. If the pixel gradient information further includes the pixel gradient average value, the division predecision may be made on the CU according to the pixel gradient variance and the pixel gradient average value. If the pixel gradient information further includes the pixel gradient mean variance, the division predecision may be made on the CU according to the pixel gradient variance and the pixel gradient mean variance. A specific implementation of making a division predecision on the CU according to the pixel gradient information is described in detail in embodiments shown in FIG. 8 to FIG. 12, and reference may be made to descriptions in the embodiments shown in FIG. 8 to FIG. 12.

In step S104, a first coding cost is determined as a second coding cost of the CU in a case that a result of the division predecision on the CU is negative. The second coding cost is used to determine a division policy of a CTU corresponding to the CU, and the first coding cost is a coding cost obtained by performing predictive coding on the CU by using a current size of the CU as a size of a PU.

In exemplary embodiments, the first coding cost is a coding cost of the CU in a PU division manner of 2N*2N. If there is only one corresponding prediction mode when the size of the PU is the current size of the CU, the first coding cost is a coding cost obtained by performing predictive coding on the CU in the prediction mode, that is, a coding cost corresponding to the prediction mode. If there is a plurality of corresponding prediction modes when the size of the PU is the current size of the CU, the first coding cost is a minimum coding cost obtained by performing predictive coding on the CU by using the current size of the CU as the size of the PU.

For example, if the size of the CU is 32*32 pixels, and there is only a prediction mode 1 corresponding to the PU with the size of 32*32 pixels, the first coding cost is a coding cost obtained by performing predictive coding on the CU in the prediction mode 1. If there are four prediction modes corresponding to the PU with the size being 32*32 pixels: a prediction mode 1, a prediction mode 2, a prediction mode 3, and a prediction mode 4, coding costs obtained by performing predictive coding on the CU in the four prediction modes are c11, c12, c13, and c14 respectively, and c11<c12<c13<c14, the first coding cost is c11.

In exemplary embodiments, the second coding cost refers to a final coding cost of the CU. If the CU is a CTU, a second coding cost of the CTU may be equivalent to the minimum coding cost (c0) of the CTU determined after the recursion process in the processes shown in FIG. 3E. Because the second coding cost is the first coding cost, it may be determined that a division policy of the CTU is negative according to the division status shown in FIG. 4. If the CU is neither the CTU nor the CU of the fourth layer, the second coding cost of the CU may be equivalent to the minimum coding cost (c21, c31, or the like) of the CU determined by comparing the minimum coding cost of the CU in the PU division manner of 2N*2N with the minimum coding cost of the CU in the PU division manner of N*N in the processes shown in FIG. 3C or FIG. 3D. The second coding cost is used for calculating a minimum coding cost of a CU of an upper layer of the CU in the PU division manner of N*N, a second coding cost of the CTU may be determined through recursion, and then a division policy of the CTU may be determined.

In exemplary embodiments, after a CU is determined to be subject to predictive coding in an intra-frame prediction mode, pixel gradient information of the CU is determined, and a division predecision is made on the CU according to the pixel gradient information of the CU. When a result of the division predecision is negative, a coding cost obtained by performing predictive coding on the CU by using a current size of the CU as a size of a PU is determined as a final coding cost of the CU. Further, it may be determined that the CU does not need to be divided, and division of the CU is ended in advance. A process of dividing the CU into sub-CUs, performing predictive coding by using the sub-CUs as new CUs, and calculating coding costs is avoided, thereby reducing calculation workload and improving a coding rate.

Figure 6:
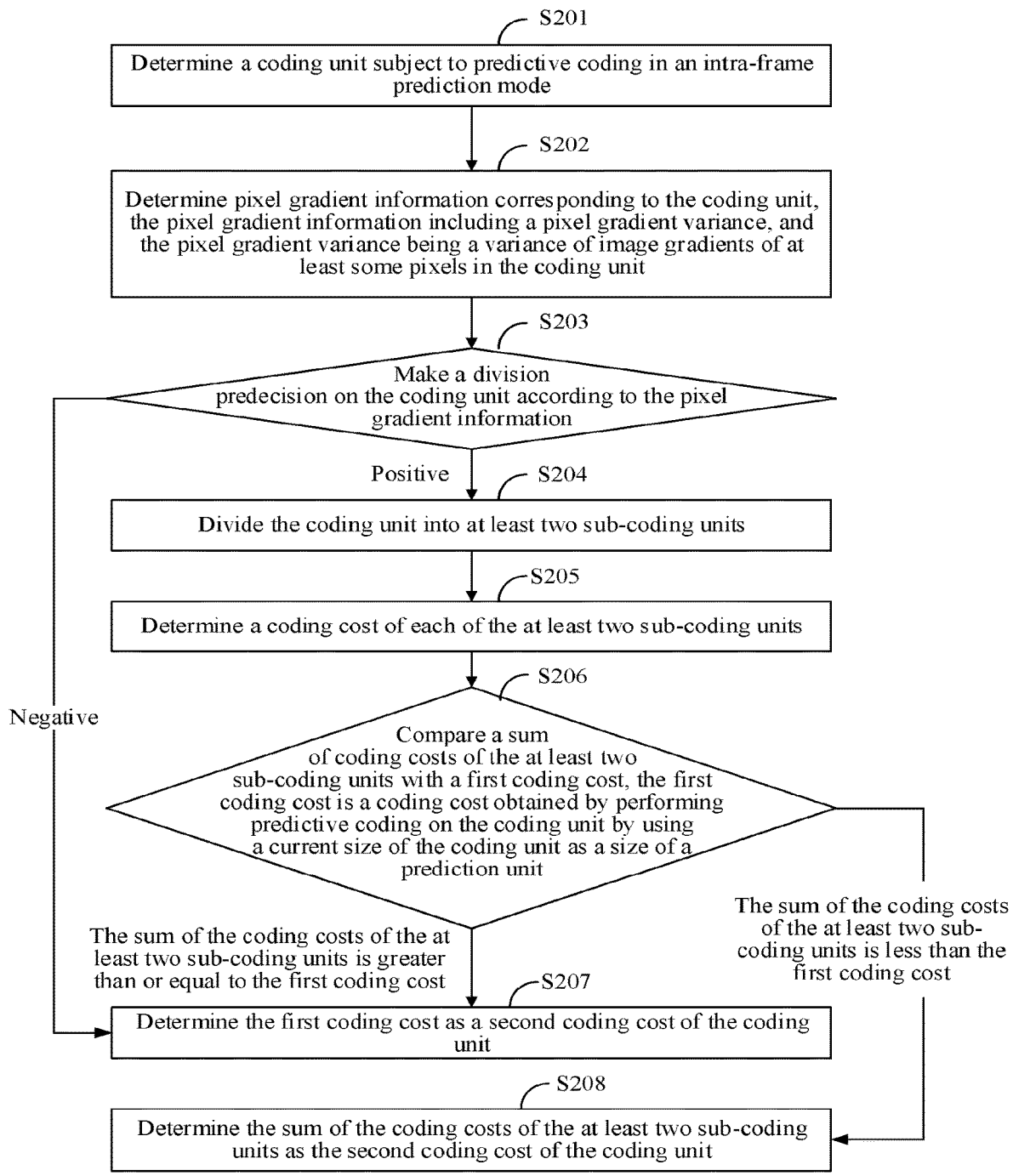
FIG. 6 is a flowchart of a method for determining a coding cost of a CU according to an exemplary embodiment of the present disclosure.

FIG. 6 is a flowchart of a method for determining a coding cost of a CU according to an exemplary embodiment of the present disclosure. The method illustrated in FIG. 6 may be performed by a video coding server, or by any other device as one of ordinary skill would recognize. The method includes steps S201 to S208, which are described in detail below.

In step S201, a CU subject to predictive coding in an intra-frame prediction mode is determined. The CU may be obtained by dividing a CTU, and a size of the CU may be any one of 8*8 pixels, 16*16 pixels, 32*32 pixels, and 64*64 pixels. In exemplary embodiments, the predictive coding in the intra-frame prediction mode refers to performing predictive coding by using a CU of a current frame as a reference CU, and the reference CU refers to a CU that has been coded.

If the CU is a CU in an I frame, because only intra-frame predictive coding is adopted for the I frame, the CU may be directly determined as a CU subject to predictive coding in the intra-frame prediction mode. If the CU is a CU in a non-I frame (for example, a P frame or a B frame), the CU subject to predictive coding in the intra-frame prediction mode may be determined with reference to an intra-frame mode decision algorithm in the H.264/AVC standard, in which after inter-frame predictive coding is performed on the CU and an optimal inter-frame mode is selected, an average bit rate of the CU and an average boundary error of the CU are determined. If the average bit rate of the CU is greater than or equal to the average boundary error of the CU, it is determined that the CU is a CU subject to predictive coding in the intra-frame prediction mode. Of course, if the CU is the CU in the non-I frame, the CU subject to predictive coding in the intra-frame prediction mode may alternatively be determined in other manners without limitation.

If a size of the CU is equal to a size of an SCU, that is, 8*8 pixels, and the CU cannot be further divided, step S207 is performed without step S202 to step S206, that is, a first coding cost is determined as a second coding cost of the CU. Otherwise, steps S202 to S206 are performed as described below.

In step S202, pixel gradient information corresponding to the CU is determined. The pixel gradient information includes a pixel gradient variance, and the pixel gradient variance is a variance of image gradients of at least some pixels in the CU. In in exemplary embodiments, the pixel gradient information corresponding to the CU is information obtained according to an image gradient of a pixel in the CU. The pixel gradient information may be information obtained according to image gradients of some or all pixels in the CU.

In addition to the pixel gradient variance, the pixel gradient information may further include parameters, for example, a pixel gradient average value and a pixel gradient variance mean variance, used for measuring smoothness and texture complexity of an image. The pixel gradient average value refers to an average value of the image gradients of some or all the pixels in the CU. The pixel gradient mean variance refers to a mean variance of the image gradients of some or all the pixels in the CU.

In exemplary embodiments, pixel gradient information of each pixel in the CU may be determined by using an image gradient algorithm, to determine image gradients of some or all pixels in the CU, and the pixel gradient information corresponding to the CU may be further determined according to the image gradients of some or all the pixels in the CU. The image gradient algorithm may be an image gradient algorithm based on a first derivative, for example, a Roberts operator, a Sobel operator, or a Prewitt operator. Alternatively, the image gradient algorithm may be an image gradient algorithm based on a second derivative, for example, a Laplace operator.

In exemplary embodiments, if the pixel gradient information is the information obtained according to the image gradients of some pixels in the CU, the pixels may be some pixels selected randomly from all the pixels in the CU. Alternatively, the pixels may be some pixels selected from all the pixels in the CU according to a specific selecting rule, for example, may be some pixels selected according to a preset sampling rate. For example, the preset sampling rate is 90%, the size of the CU is 64*64 pixels, that is, 4096 pixels, and some pixels in the CU are 3687 pixels in the 4096 pixels. All the pixels in the CU may be sampled from left to right and from top to bottom to obtain the 3687 pixels.

In step S203, a division predecision regarding the CU is made according to the pixel gradient information. If the pixel gradient information is the pixel gradient variance, the division predecision may be made on the CU according to the pixel gradient variance. If the pixel gradient information further includes the pixel gradient average value, the division predecision may be made on the CU according to the pixel gradient variance and the pixel gradient average value. If the pixel gradient information further includes the pixel gradient mean variance, the division predecision may be made on the CU according to the pixel gradient variance and the pixel gradient mean variance. Further details regarding the making of a division predecision on the CU according to the pixel gradient information are described with reference to FIG. 8 to FIG. 12 below.

If a result of the division predecision on the CU is negative, step S207 is performed. If the result of the division predecision on the CU is positive, step S204 is performed.

In step S204, the CU is divided into at least two sub-CUs. In exemplary embodiments, the CU may be divided into four sub-CUs with reference to a full quadtree manner in the related art. The CU may also be divided into another quantity of sub-CUs. Thus, the specific method of division is not limiting upon the present disclosure.

In step S205, a coding cost of each of the at least two sub-CUs is determined. In exemplary embodiments, the at least two sub-CUs may be determined as new CUs subject to predictive coding in the intra-frame prediction mode, and steps S201 to S208 are performed to determine a coding cost of each of the sub-CUs.

In step S206, a sum of coding costs of the at least two sub-CUs with a first coding cost are compared. The first coding cost is a coding cost obtained by performing predictive coding on the CU by using a current size of the CU as a size of a PU. In exemplary embodiments, the first coding cost is a coding cost of the CU in a PU division manner of 2N*2N. If there is only one corresponding prediction mode when the size of the PU is the current size of the CU, the first coding cost is a coding cost obtained by performing predictive coding on the CU in the prediction mode, that is, a coding cost corresponding to the prediction mode. If there is a plurality of corresponding prediction modes when the size of the PU is the current size of the CU, the first coding cost is a minimum coding cost obtained by performing predictive coding on the CU by using the current size of the CU as the size of the PU.

For example, if the size of the CU is 32*32 pixels, and there is only a prediction mode 1 corresponding to the PU with the size of 32*32 pixels, the first coding cost is a coding cost obtained by performing predictive coding on the CU in the prediction mode 1. If there are four prediction modes corresponding to the PU with the size of 32*32 pixels: a prediction model, a prediction mode 2, a prediction mode 3, and a prediction mode 4, coding costs obtained by performing predictive coding on the CU in the four prediction modes are $c11$, $c12$, $c13$, and $c14$ respectively, and $c11<c12<c13<c14$, the first coding cost is $c11$.

If the sum of the coding costs of the at least two sub-CUs is greater than or equal to the first coding cost, step S207 is performed. If the sum of the coding costs of the at least two sub-CUs is less than the first coding cost, step S208 is performed. In step S207, the first coding cost is determined as a second coding cost of the CU. In step 208, the sum of the coding costs of the at least two sub-CUs is determined as the second coding cost of the CU.

In exemplary embodiments, the second coding cost refers to a final coding cost of the CU. If the CU is a CTU, a second coding cost of the CTU may be equivalent to the minimum coding cost (c0) of the CTU determined after the recursion process in the processes shown in FIG. 3E. Because the second coding cost is the first coding cost, it may be determined that a division policy of the CTU is negative according to the division status shown in FIG. 4. If the CU is neither the CTU nor the CU of the fourth layer, the second coding cost of the CU may be equivalent to the minimum coding cost (c21, c31, and the like) of the CU determined by comparing the minimum coding cost of the CU in the PU division manner of 2N*2N with the minimum coding cost of the CU in the PU division manner of N*N in the processes shown in FIG. 3C or FIG. 3D. The second coding cost is used for calculating a minimum coding cost of a CU of an upper layer of the CU in the PU division manner of N*N, a second coding cost of the CTU may be determined through recursion, and then a division policy of the CTU may be determined.

In exemplary embodiments, after a CU is determined to be subject to predictive coding in an intra-frame prediction mode, pixel gradient information of the CU is determined, and a division predecision is made on the CU according to the pixel gradient information of the CU. When a result of the division predecision is negative, a coding cost obtained by performing predictive coding on the CU by using a current size of the CU as a size of a PU is determined as a final coding cost of the CU. Further, it may be determined that the CU does not need to be divided, and division of the CU is ended in advance. Only when the result of the division predecision is positive, the CU is divided, and then a sum of coding costs of sub-CUs corresponding to the CU is compared with a first coding cost. Because the same method for determining a coding cost is adopted for determining the coding costs of the sub-CUs, further division of a sub-CU may be ended in advance. Division of the CU is ended as early as possible, so that a large quantity of processes of calculating a coding cost is avoided, thereby reducing calculation workload, determining a division policy of a CTU as soon as possible, and improving a coding speed.

The following describes, by using an example that a CU is divided into four sub-CUs, a process of determining a division policy of a CTU by using the technical solutions of the embodiments of this application. A size of a CTU is 64*64 pixels is used as an example, referring to FIG. 7A to FIG. 7E.

Figure 7A:
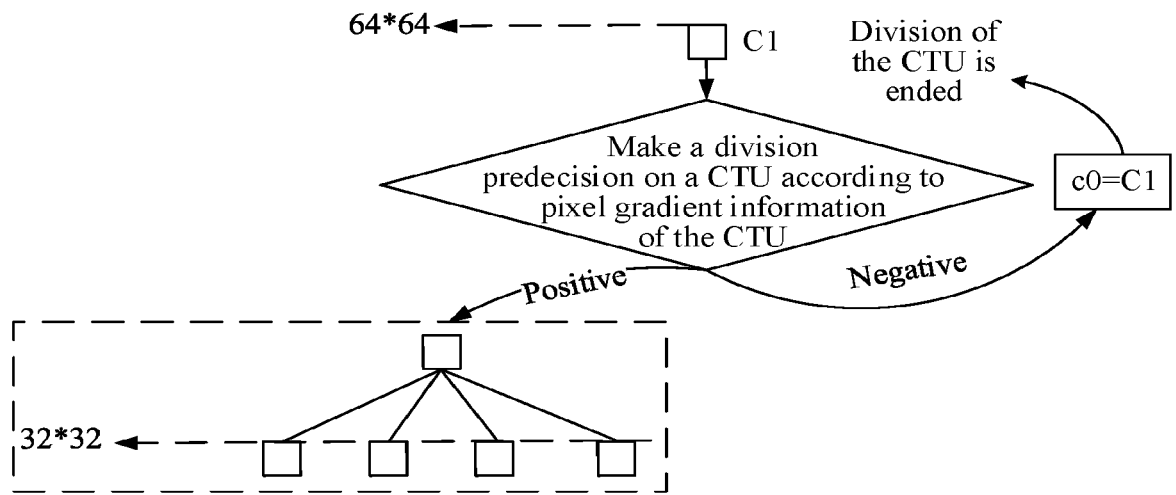
FIG. 7A is a schematic diagram of a process for determining a division policy of a CTU according to an exemplary embodiment of the present disclosure.

First, as shown in FIG. 7A, a CTU is determined as a CU, predictive coding is performed on the CTU by using 64*64 pixels as a size of a PU to determine an optimal prediction mode of the CTU, and determine a coding cost C1 of the CTU in the optimal prediction mode. The coding cost is a first coding cost of the CTU. A division predecision is made on the CTU according to pixel gradient information of the CTU.

If a result of the division predecision on the CTU is negative, the first coding cost C1 is determined as a second coding cost of the CTU, that is, c0=C1. In this case, as the second coding cost of the CTU is determined, it may be learned from FIG. 4 that a division policy of the CTU is determined, that is, the CTU does not need to be divided and division is ended. The division policy of the CTU is determined without calculating coding costs of CUs of the second layer, CUs of the third layer, and CUs of the fourth layer in sequence as in the process shown in FIG. 3B. The processes of FIG. 3C to FIG. 3B do not need to be performed in this case, thereby saving a large amount of calculation and improving a coding speed.

Figure 7B:
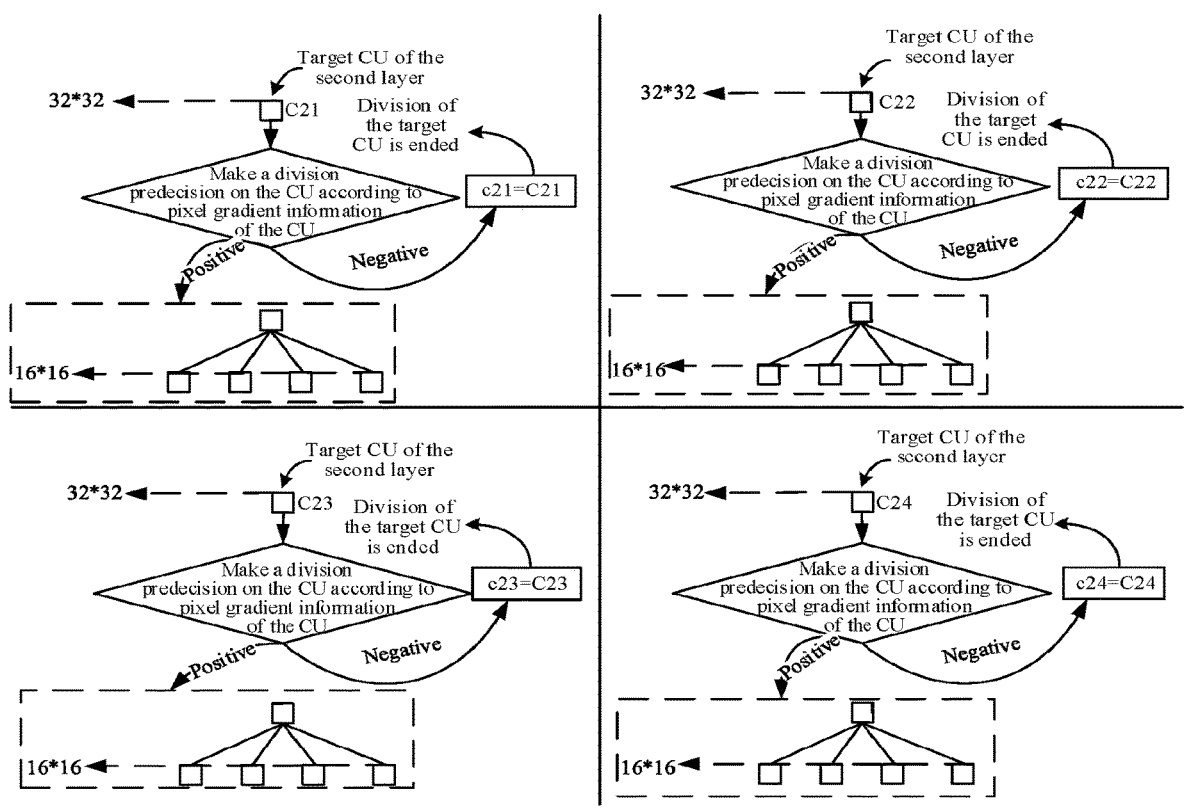
FIG. 7B is another schematic diagram of a process for determining a division policy of a CTU according to an exemplary embodiment of the present disclosure.

If the result of the division predecision on the CTU is positive, the CTU is divided into four CUs with 32*32 pixels, that is, the CUs of the second layer. Then, as shown in FIG. 7B, predictive coding is performed on each CU of the second layer by using 32*32 pixels as the size of the PU to determine an optimal prediction mode of each CU, and determine a coding cost of each CU of the second layer in the optimal prediction mode. The coding cost is a first coding cost of each CU of the second layer, that is, C21, C22, C23, and C24. A division predecision is made on each CU of the second layer according to pixel gradient information of each CU of the second layer.

If a result of the division predecision on a target CU of the second layer is negative, a first coding cost is determined as a second coding cost of the target CU of the second layer. In this case, because the second coding cost of the target CU of the second layer is determined, division of the target CU of the second layer is ended. There is no need to calculate coding costs of the CUs of the third layer and the CUs of the fourth layer under the target CU in sequence as in the process shown in FIG. 3B, thereby saving a large amount of calculation and improving a coding speed.

Figure 7C:
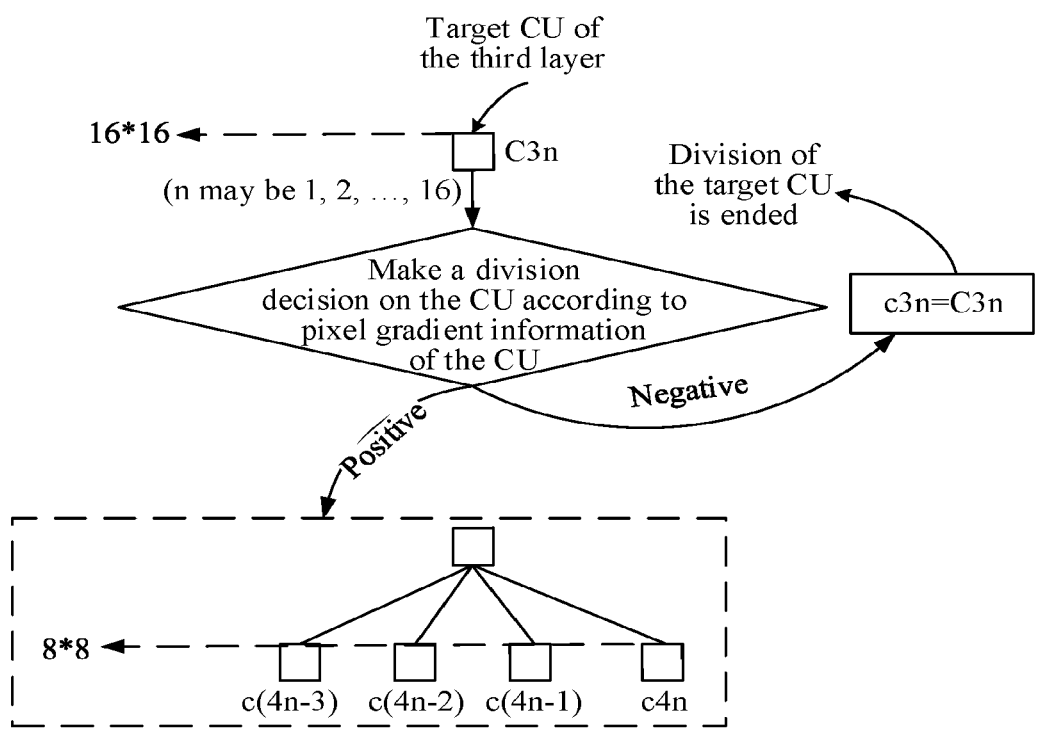
FIG. 7C is another schematic diagram of a process for determining a division policy of a CTU according to an exemplary embodiment of the present disclosure.

If the result of the division predecision on the target CU of the second layer is positive, the target CU of the second layer is divided into four sub-CUs with 16*16 pixels, that is, the CUs of the third layer. As shown in FIG. 7C, predictive coding is performed on each CU of the third layer by using 16*16 pixels as the size of the PU to determine an optimal prediction mode of each CU of the third layer, and determine a coding cost of each CU of the third layer in the optimal prediction mode. The coding cost is a first coding cost of each CU of the third layer. A division predecision is made on each CU of the third layer according to pixel gradient information of each CU of the third layer.

If a result of the division predecision on a target CU of the third layer is negative, a first coding cost of the target CU of the third layer is determined as a second coding cost of the target CU of the third layer. In this case, because the second coding cost of the target CU of the third layer is determined, division of the target CU of the third layer is ended. The target CU is determined not to be divided, and there is no need to calculate coding costs of the CUs of the fourth layer under the target CU in sequence as in the process shown in FIG. 3B, thereby saving a large amount of calculation and improving a coding speed.

If the result of the division predecision on the target CU of the third layer is positive, the target CU of the third layer is divided into four CUs with 8*8 pixels, that is, the CUs of the fourth layer.

As shown in FIG. 7C, predictive coding is performed on each CU of the fourth layer by using 8*8 pixels as the size of the PU to determine an optimal prediction mode of each CU of the fourth layer, and determine a coding cost of each CU of the fourth layer in the optimal prediction mode. The coding cost is a first coding cost of each CU of the fourth layer.

If a tree structure is formed, second coding costs of CUs whose second coding costs are not determined in the CUs of the first layer, the second layer, and the third layer are determined in sequence from bottom to top. A smaller one of two coding costs (the first coding cost of the CU and a sum of second coding costs of four sub-CUs under the CU) of the CU is determined as a second coding cost of the CU.

Figure 7D:
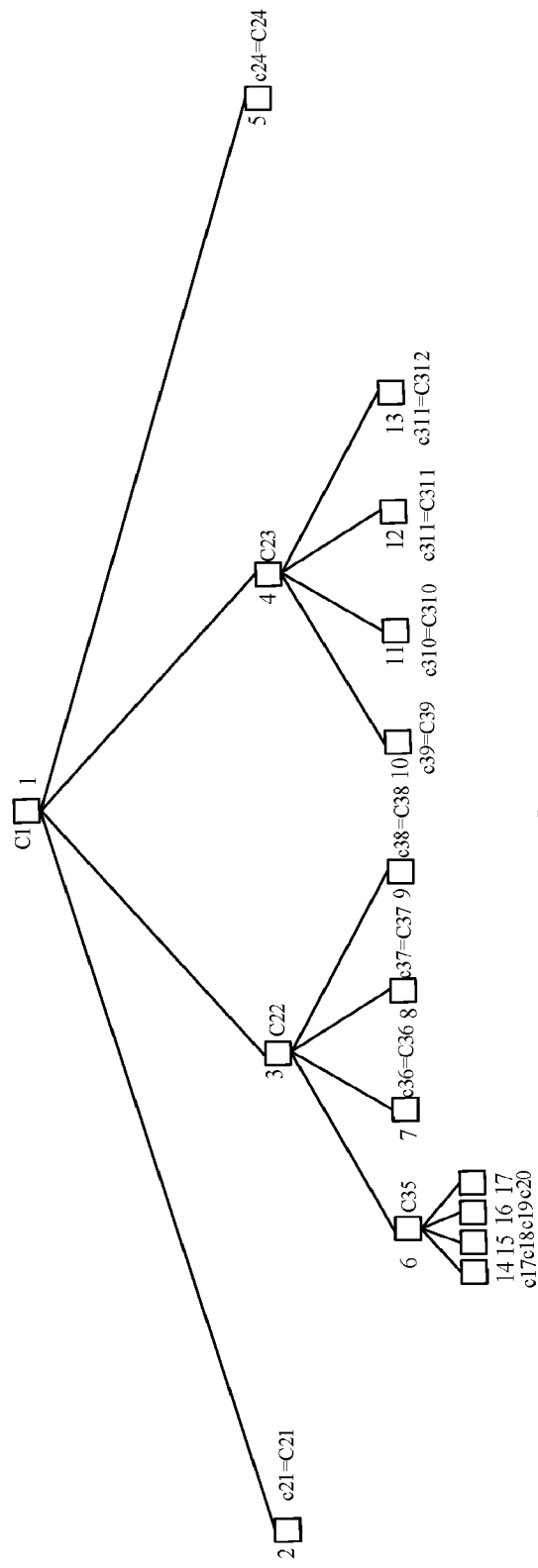
FIG. 7D is another schematic diagram of a process for determining a division policy of a CTU according to an exemplary embodiment of the present disclosure.

For example, the tree structure determined according to the processes of FIG. 7A to FIG. 7C is shown in FIG. 7D. It is determined that a CU numbered 1 (that is, a CTU) needs to be divided according to the process shown in FIG. 7A. It is determined that CUs numbered 3 and 4 need to be divided and CUs numbered 2 and 5 do not need to be divided according to the process shown in FIG. 7B. In this case, second coding costs of the CUs numbered 2 and 5 are determined, which are first coding costs of the CUs, and second coding costs of the CUs numbered 3 and 4 are not determined. It is determined that CUs numbered 7 to 13 need to be divided and CUs numbered 6 does not need to be divided according to the process shown in FIG. 7C. In this case, second coding costs of the CUs numbered 7 to 13 are determined, which are first coding costs of the CUs, and a second coding cost of the CU numbered 6 is not determined.

Figure 7E:
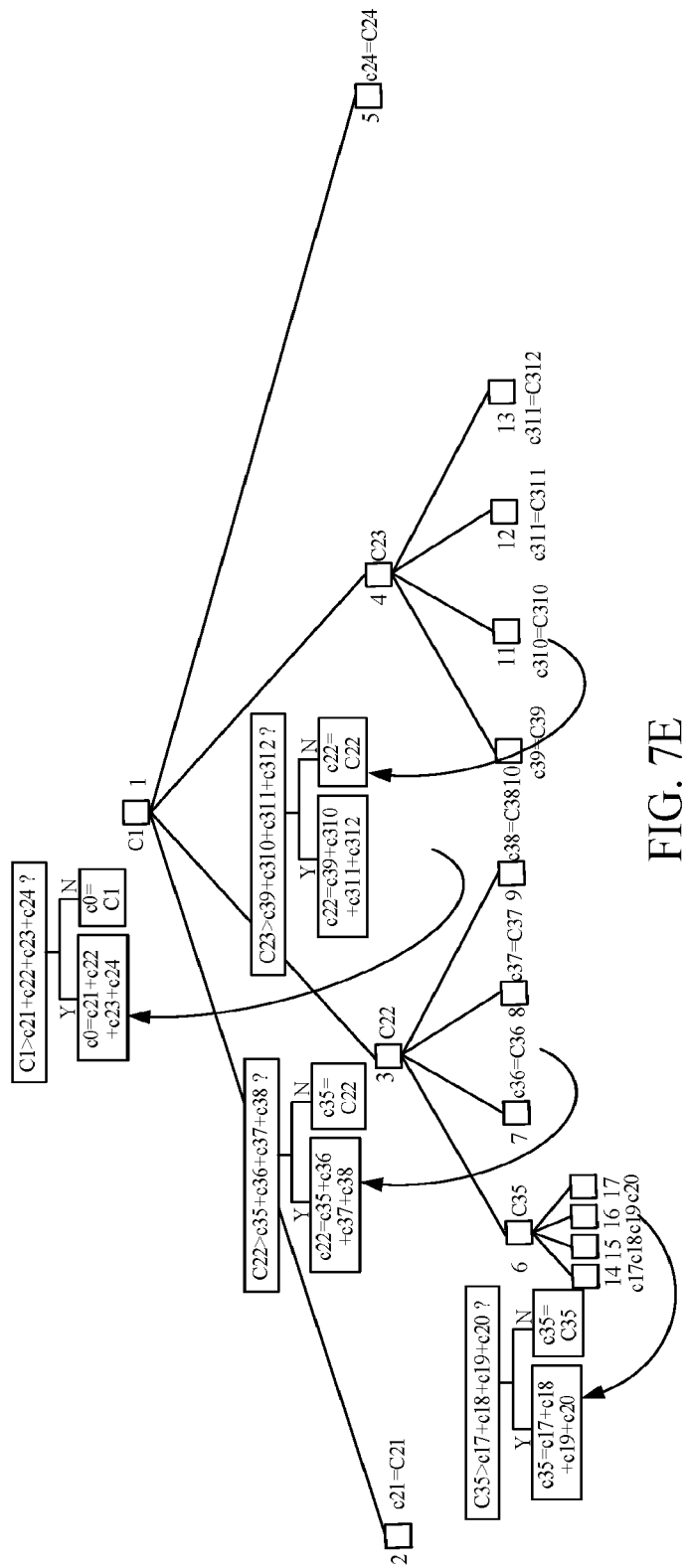
FIG. 7E is another schematic diagram of a process for determining a division policy of a CTU according to an exemplary embodiment of the present disclosure.

Then, second coding costs of the CUs whose second coding costs are not determined are determined in sequence from bottom to top, that is, the second coding costs of the CUs numbered 6, 3, 4, and 1 are determined in sequence. As shown in FIG. 7E, first, the second coding cost of the CU numbered 6 in the CUs of the third layer is determined, then, the second coding costs of the CUs numbered 3 and 4 in the CUs of the second layer are determined, and finally, the second coding cost of the CU numbered 1, that is, the CTU, is determined.

After the second coding costs of the CUs of each layer are determined, a division manner of the CTU is determined according to minimum coding costs of the CUs of each layer. If the second coding cost of the CTU is the first coding cost of the CTU, it is determined that the CTU is not divided and the tree structure of the CTU has only one layer, that is, a root node. A corresponding division status is shown in A of FIG. 4. If the second coding cost of the CTU is a sum of the second coding costs of the CUs of the second layer, it is determined that the CTU needs to be divided into four CUs, as shown in B of FIG. 4. When it is determined that the CTU is divided into the four CUs, a division manner of the second layer may be further determined according to the second coding costs of the CUs of the second layer, and so on. In this way, a final division status of the CTU may be determined.

It may be learned from FIG. 7A to FIG. 7E that the traversal and recursion manner shown in FIG. 3 is required only in an extreme case, that is, the result of the division predecision on each CU of the three upper layers (the first layer, the second layer, and the third layer) is positive, to determine the division policy of the CTU. Provided that a result of a division predecision on one CU in the three upper layers is negative, minimum coding costs of CUs under the CU may not be calculated. Because relatively complex calculation is required for determining a minimum coding cost of a CU, the solutions of the embodiments of this application can save a large amount of calculation, reduce a calculation time, and improve a coding speed.

Figure 8:
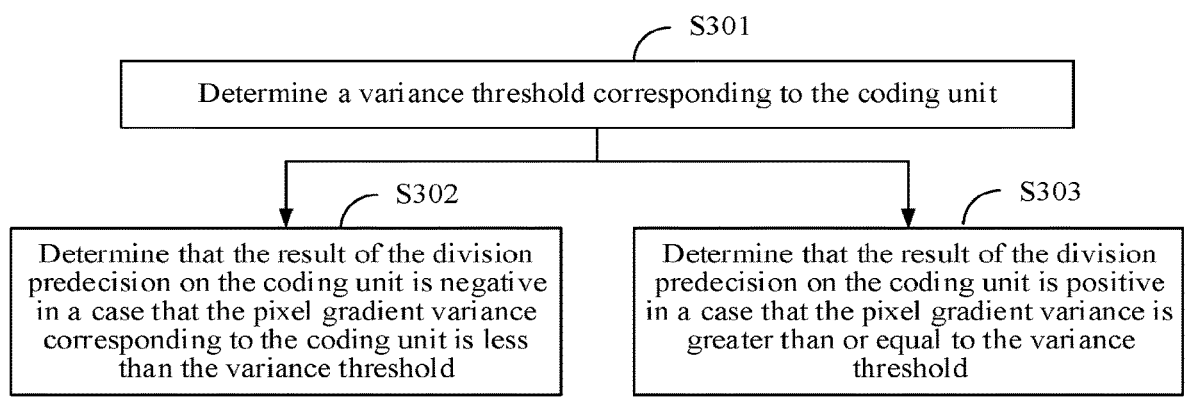
FIG. 8 is a flowchart of a method for determining a coding cost of a CU according to an exemplary embodiment of the present disclosure.

FIG. 8 is a schematic flowchart of a method for determining a coding cost of a CU according to an embodiment of this application. As shown in FIG. 8, in this embodiment of this application, the making a division predecision on the CU according to the pixel gradient information may include steps S301 to S303.

In step S301 a variance threshold corresponding to the CU is determined. In exemplary embodiments, there are two cases for the variance threshold corresponding to the CU. A first case is that the variance threshold is a fixed threshold, and a second case is that the variance threshold is in a positive correlation with a quantization parameter corresponding to the CU. That is, a greater quantization parameter corresponding to the CU indicates a greater variance threshold.

The quantization parameter reflects a compression status of space details. If the quantization parameter is small, most of the details are retained. If the quantization parameter is increased, the details are lost, and a bit rate is reduced, that is, the quantization parameter is in a negative correlation with the bit rate and the variance threshold is in a negative correlation with the bit rate. A value of the quantization parameter may be determined by an encoder. A value range of the quantization parameter is 0 to 52. When the quantization parameter is greater than 0, the variance threshold corresponding to the CU may be equal to a product of the quantization parameter corresponding to the CU and X, and X is greater than or equal to 1.

In step S302, the result of the division predecision on the CU is determined to be negative in a case that the pixel gradient variance corresponding to the CU is less than the variance threshold. The pixel gradient variance corresponding to the CU is used for reflecting statuses of a texture and an object boundary in an image of the CU. A relatively small pixel gradient variance of the CU indicates that the image of the CU may have a messy texture, and further division of the CU is not helpful to improve image quality. Due to the messy texture, eyes are not sensitive to the CU, and no further division is required.

In step S303, the result of the division predecision on the CU is determined to be positive in a case that the pixel gradient variance is greater than or equal to the variance threshold. A relatively large pixel gradient variance indicates that the CU may include an object boundary, and further division may help to improve the image quality. After further division, sub-CUs corresponding to the CU have higher similarity and compression efficiency is facilitated to improve.

In exemplary embodiments, the predecision on whether the CU is divided is made according to the pixel gradient variance of the CU. The pixel gradient variance of the CU reflects the statuses of the texture and the boundary in the image of the CU, and division of the CU may be ended in advance according to the pixel gradient variance, thereby reducing calculation workload and balancing compression efficiency and image quality.

Figure 9:
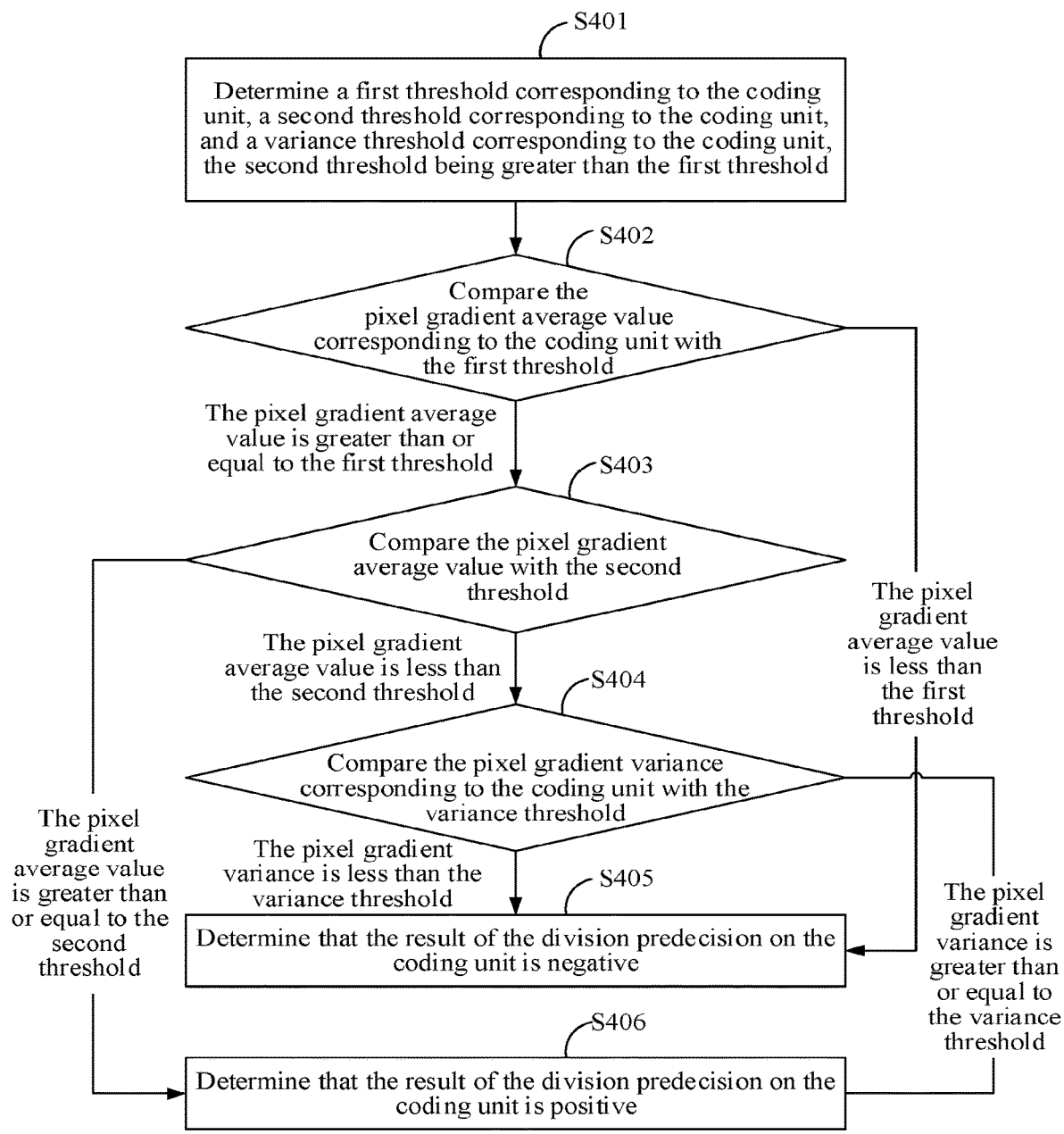
FIG. 9 is a flowchart of a method for determining a coding cost of a CU according to an exemplary embodiment of the present disclosure.

In exemplary embodiments, the pixel gradient information according to the embodiments of this application may further include the pixel gradient average value. FIG. 9 is a schematic flowchart of a method for determining a coding cost of a CU according to an embodiment of this application. In exemplary embodiments, the making a division predecision on the CU according to the pixel gradient information may include the following steps S401 to S406.

In step S401, a first threshold corresponding to the CU, a second threshold corresponding to the CU, and a variance threshold corresponding to the CU are determined. The second threshold is greater than the first threshold.

In exemplary embodiments, there are two cases for the variance threshold corresponding to the CU. One case is that the variance threshold is a fixed threshold, and the other case is that the variance threshold is in a positive correlation with a quantization parameter corresponding to the CU. That is, a greater quantization parameter corresponding to the CU indicates a greater variance threshold.

The quantization parameter reflects a compression status of space details. If the quantization parameter is small, most of the details are retained. If the quantization parameter is increased, the details are lost, and a bit rate is reduced, that is, the quantization parameter is in a negative correlation with the bit rate and the variance threshold is in a negative correlation with the bit rate. A value of the quantization parameter may be determined by an encoder. A value range of the quantization parameter is 0 to 52. When the quantization parameter is greater than 0, the variance threshold corresponding to the CU may be equal to a product of the quantization parameter corresponding to the CU and X, and X is greater than or equal to 1.

In exemplary embodiments, both the first threshold and the second threshold are average thresholds. If the first threshold corresponding to the CU is not 0, the second threshold corresponding to the CU may be a fixed multiple of the first threshold corresponding to the CU. To be specific, the second threshold corresponding to the CU is a product of the first threshold corresponding to the CU and a second coefficient, the second coefficient being greater than 1. If the first threshold corresponding to the CU is 0, the second threshold corresponding to the CU may be a sum of the first threshold corresponding to the CU and a target average threshold, the target average threshold being a fixed threshold.

In exemplary embodiments, the first threshold corresponding to the CU may be a fixed threshold. If the first threshold corresponding to the CU is a fixed threshold, the first threshold is in a negative correlation with the size of the CU.

Figures 10, 11:
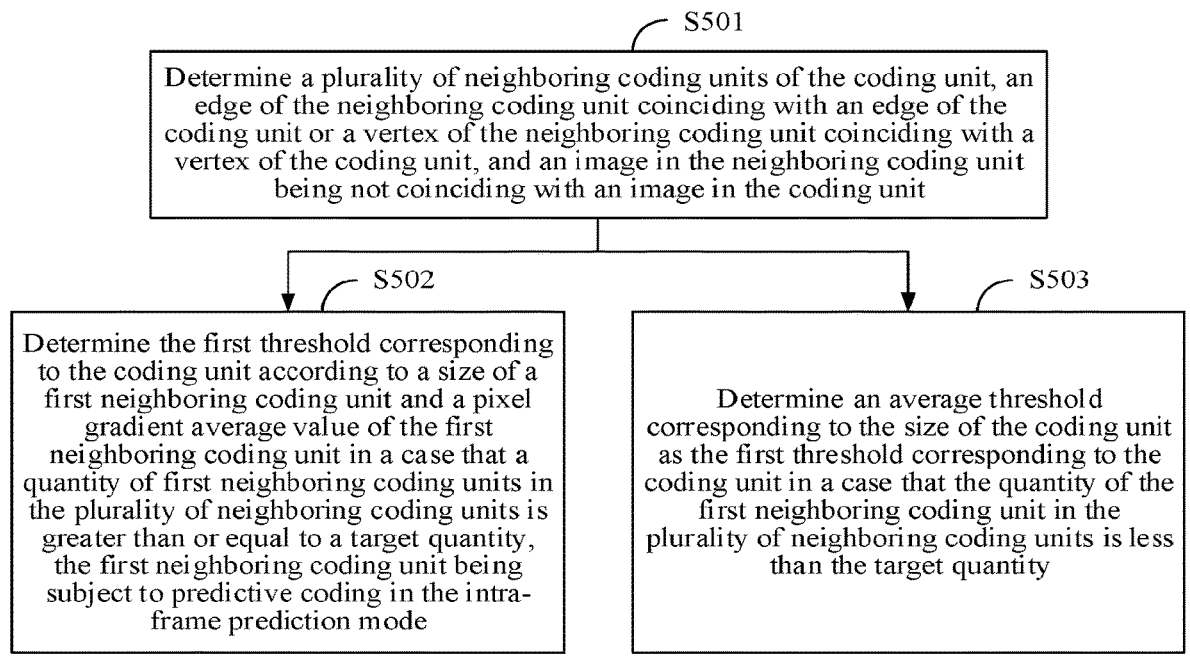
FIG. 10 is a flowchart of a method for determining a coding cost of a CU according to an exemplary embodiment of the present disclosure.
FIG. 11 is a schematic diagram of a neighboring CU according to an exemplary embodiment of the present disclosure.

In exemplary embodiments, the first threshold corresponding to the CU may alternatively be correlated with an average value of pixel gradients of CUs near the CU. In specific implementation, as shown in FIG. 10, the determining a first threshold corresponding to the CU includes the following steps S501 to S503.

In step S501, a plurality of neighboring CUs of the CU is determined. An edge of the neighboring CU coincides with an edge of the CU or a vertex of the neighboring CU coincides with a vertex of the CU, and an image in the neighboring CU does not coincide with an image in the CU.

It may be understood that the neighboring CU may be a CU near the CU and connected with the CU. The neighboring CU may be a CU on which predictive coding has been performed. A size of the neighboring CU may be the same as the size of the CU, or may be different from the size of the CU.

The following describes the neighboring CU by using an example. As shown in FIG. 11, if the CU is CU1 shown in FIG. 11, as CU7, CU17, CU19, CU20, and CU23 each have an edge coinciding with an edge of CU1, and CU6, CU10, CU22, and CU24 each have a vertex coinciding with a vertex of CU1, CU6, the CU7, CU10, CU17, CU19, CU20, CU22, CU23, and CU24 are all neighboring CUs of CU1, and because remaining CUs have no edge or vertex coinciding with that of CU1, the remaining CUs are not neighboring CUs of the CU.

Further, the neighboring CU may alternatively be a CU near the CU and in a specific orientation. For example, the neighboring CUs are neighboring CUs near the CU and located in an upper left orientation, a right above orientation, an upper right orientation, and a right left orientation. In this case, in FIG. 11, CU6, CU7, CU10, CU17, and CU19 are neighboring CUs of CU1.

Continuing to use CU1 as the exemplary CU, if the neighboring CU is defined as a CU with the same size as the CU, neighboring CUs of CU1 may be: a CU formed by combining CU3, CU4, CU5, and CU6, CU7, a CU formed by combining CU8, CU9, CU10, and CU11, a CU formed by combining CU16, CU17, CU18, and CU19, CU20, CU22, CU23, and a CU formed by combining CU24, CU25, CU26, and CU27. Of course, the above descriptions are only examples, and in no way limit the present disclosure.

In step S502, the first threshold corresponding to the CU is determined according to a size of a first neighboring CU and a pixel gradient average value of the first neighboring CU in a case that a quantity of first neighboring CUs in the plurality of neighboring CUs is greater than or equal to a target quantity. The first neighboring CU is subject to predictive coding in the intra-frame prediction mode. In exemplary embodiments, the target quantity may be set to 4, 5, 6, or other values. In exemplary embodiments, if the CU is a CU in an I frame, all the neighboring CUs determined in step S501 are first neighboring CUs. If the CU is a CU in a non-I frame, the first neighboring CUs may be determined in the plurality of neighboring CUs according to the manner described in step S101.

Figure 12:
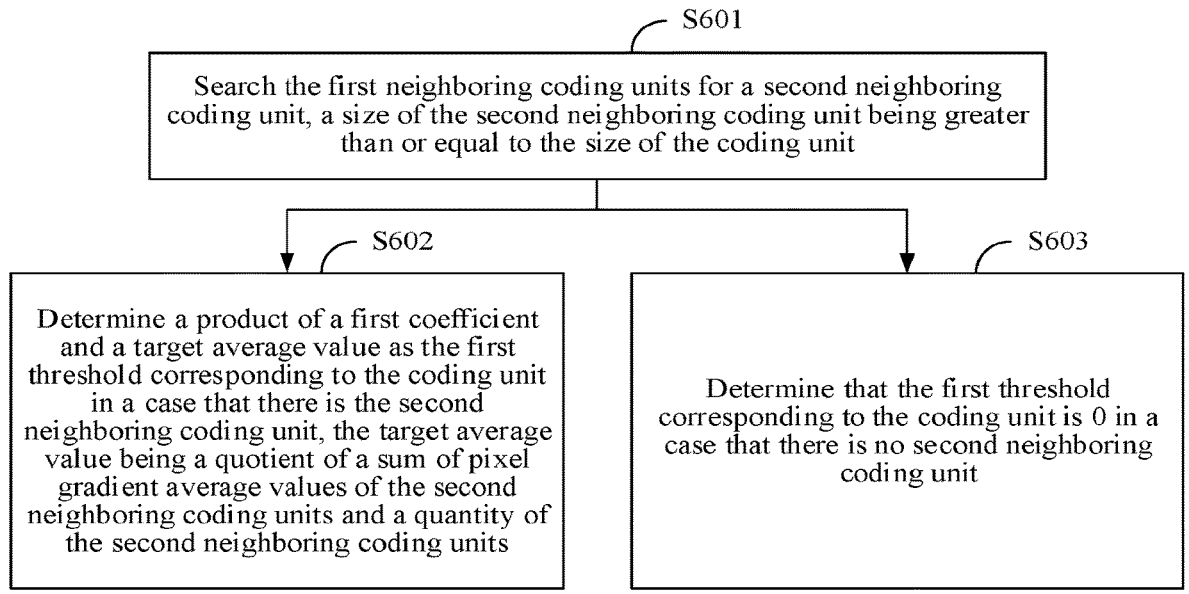
FIG. 12 is a flowchart of a method for determining a coding cost of a CU according to an exemplary embodiment of the present disclosure.

In exemplary embodiments, as shown in FIG. 12, the determining the first threshold corresponding to the CU according to a size of a first neighboring CU and a pixel gradient average value of the first neighboring CU includes the following steps S601 to S603.

In step S601, the first neighboring CUs is searched for a second neighboring CU. A size of the second neighboring CU is greater than or equal to the size of the CU. For example, in the neighboring CUs shown in FIG. 11, CU7, CU10, CU17, CU20, CU22, and CU23 are all CUs subject to predictive coding in the intra-frame prediction mode. As sizes of CU7, CU20, CU22, and CU23 are all equal to the size of CU1, CU7, CU20, CU22, and CU23 are all second neighboring CUs.

In step S602, a product of a first coefficient and a target average value is determined as the first threshold corresponding to the CU in a case that there is the second neighboring CU. The target average value is a quotient of a sum of pixel gradient average values of the second neighboring CUs and a quantity of the second neighboring CUs.

The first coefficient may be a coefficient greater than 1. In exemplary embodiments, a pixel gradient average value corresponding to each neighboring CU may be determined according to the manner of determining pixel gradient information corresponding to a CU described in step S102. For example, if the second neighboring CUs are a CU 2, a CU 3, a CU 4, and a CU 5, and corresponding pixel gradient average values are a pixel gradient average value 1, a pixel gradient average value 2, a pixel gradient average value 3, and a pixel gradient average value 4 respectively, the target average value is (the pixel gradient average value 1+the pixel gradient average value 2+the pixel gradient average value 3+the pixel gradient average value 4)/4.

In step S603, the first threshold corresponding to the CU is determined to be 0 in a case that there is no second neighboring CU. It may be understood that the first threshold being 0 is a minimum value that can be obtained by performing gradient calculation.

The manner of step S502 is a manner of determining the first threshold corresponding to the CU designed for a case that the size of the neighboring CU may be the same as the size of the CU, or may be different from the size of the CU. In exemplary embodiments, if the neighboring CU specifically refers to a CU with the same size as the CU, step S502 may be replaced with the following. The first threshold corresponding to the CU may be determined according to a division status of a first neighboring CU and a pixel gradient average value of the first neighboring CU in a case that a quantity of first neighboring CUs in the plurality of neighboring CUs is greater than or equal to a target quantity. The first neighboring CU is a CU subject to predictive coding in an intra-frame prediction mode.

In exemplary embodiments, in the determining the first threshold corresponding to the CU according to a division status of a first neighboring CU and a pixel gradient average value of the first neighboring CU, the first neighboring CUs are searched for a third neighboring CU. The third neighboring CU is a first neighboring CU that is not divided. A product of a first coefficient and a target average value is determined as the first threshold corresponding to the CU in a case that there is the third neighboring CU. The target average value is a quotient of a sum of pixel gradient average values corresponding to third neighboring CUs and a quantity of the third neighboring CUs.

In step S503, an average threshold corresponding to the size of the CU is determined as the first threshold corresponding to the CU in a case that the quantity of the first neighboring CU in the plurality of neighboring CUs is less than the target quantity.

The average threshold corresponding to the size of the CU is a fixed threshold, and a larger size of the CU indicates a smaller average threshold corresponding to the size of the CU. In specific implementation, three average thresholds may be designed to correspond to a CU with a size of 16*16 pixels, a CU with a size of 32*32 pixels, and a CU with a size of 64*64 pixels respectively.

In step S402, the pixel gradient average value corresponding to the CU is compared with the first threshold. If the pixel gradient average value is less than the first threshold, step S405 is performed. If the pixel gradient average value is greater than or equal to the first threshold, step S403 is performed.

The pixel gradient average value corresponding to the CU is used for reflecting smoothness of image content in the CU. A relatively small pixel gradient average value of the CU indicates that the image content in the CU is relatively smooth and no further division is required.

In step S403, the pixel gradient average value is compared with the second threshold. If the pixel gradient average value is less than the second threshold, step S404 is performed. If the pixel gradient average value is greater than or equal to the second threshold, step S406 is performed. A relatively large pixel gradient average value indicates that the image content in the CU is not smooth and a possibility of requiring further division is high.

In step S404, the pixel gradient variance corresponding to the CU is compared with the variance threshold. If the pixel gradient variance is less than the variance threshold, step S405 is performed. If the pixel gradient variance is greater than or equal to the variance threshold, step S406 is performed.

The pixel gradient variance corresponding to the CU is used for reflecting statuses of a texture and an object boundary in an image of the CU. A relatively small pixel gradient variance of the CU indicates that the image of the CU may gave a messy texture, and further division of the CU is not helpful to improve an image quality. Due to the messy texture, eyes are not sensitive to the CU, and no further division is required. A relatively large pixel gradient variance indicates that the CU may include an object boundary, and further division may help to improve image quality. After the further division, sub-CUs corresponding to the CU have higher similarity, which helps to improve compression efficiency.

In step S405, the result of the division predecision on the CU is determined to be negative. In step S406, the result of the division predecision on the CU is determined to be positive.

In exemplary embodiments, the predecision on whether the CU is divided is made according to the pixel gradient variance of the CU and the pixel gradient average value of the CU. The pixel gradient variance of the CU reflects the statuses of the texture and the boundary in the image of the CU, and the pixel gradient average value reflects the smoothness of the image content in the CU. An accurate decision on whether the CU is divided can be made through comprehensive analysis of the image content in the CU, thereby reducing calculation workload and balancing compression efficiency and image quality.

An apparatus for determining a coding cost of a CU provided in the exemplary embodiments of the present disclosure is described in detail below with reference to FIG. 13 to FIG. 16. The apparatus for determining a coding cost of a CU may be a computer device including circuitry with a calculation processing function. The apparatus shown in FIG. 13 to FIG. 16 is configured to perform the method in the exemplary embodiments shown in FIG. 5 to FIG. 12 of this application. For ease of description, only a part related to the exemplary embodiments is shown. For specific technical details that are not disclosed, refer to the exemplary embodiments described above with reference to FIG. 5 to FIG. 12.

Figure 13:
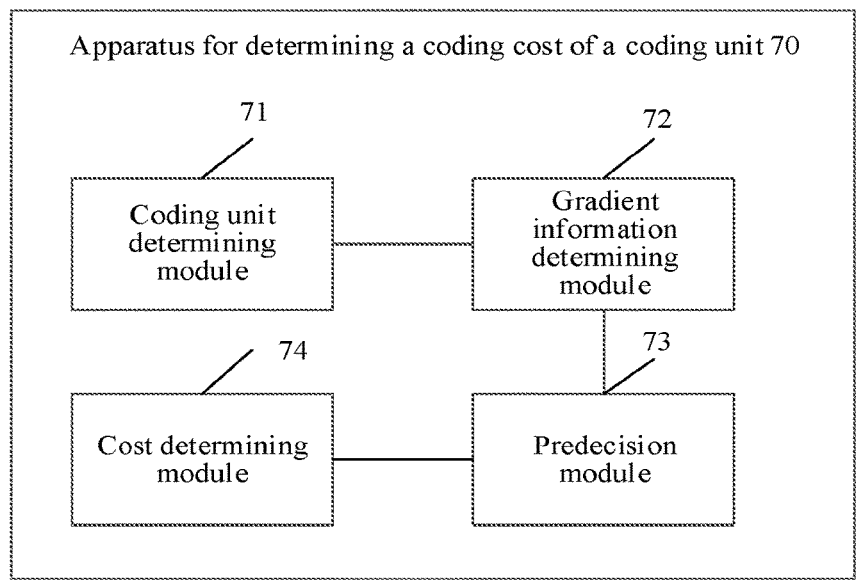
FIG. 13 is a schematic structural diagram of an apparatus for determining a coding cost of a CU according to an exemplary embodiment of the present disclosure.

FIG. 13 is a schematic structural diagram of an apparatus for determining a coding cost of a CU according to an exemplary embodiment of the present disclosure. As shown in FIG. 13, the apparatus 70 for determining a coding cost of a CU of this embodiment of this application may include a CU determining module 71, a gradient information determining module 72, a predecision module 73, and a cost determining module 74. As can be appreciated, each of these modules includes circuitry that is configured to perform the various functions assigned thereto.

For example, the CU determining module 71 includes circuitry that is configured to determine a CU subject to predictive coding in an intra-frame prediction mode. It may be understood that the CU is obtained by dividing a CTU, and a size of the CU may be any one of 8*8 pixels, 16*16 pixels, 32*32 pixels, and 64*64 pixels. In exemplary embodiments, the predictive coding in the intra-frame prediction mode refers to performing predictive coding by using a CU of a current frame as a reference CU, and the reference CU refers to a CU that has been coded.

In exemplary embodiments, if the CU is a CU in an I frame, because only intra-frame predictive coding is adopted for the I frame, the CU determining module 71 may directly determine the CU as a CU subject to predictive coding in the intra-frame prediction mode. If the CU is a CU in a non-I frame (for example, a P frame or a B frame), the CU subject to predictive coding in the intra-frame prediction mode may be determined with reference to an intra-frame mode decision algorithm in the H.264/AVC standard, in which after performing inter-frame predictive coding on the CU and selecting an optimal inter-frame mode, the CU determining module 71 determines an average bit rate of the CU and an average boundary error of the CU. If the average bit rate of the CU is greater than or equal to the average boundary error of the CU, the CU determining module 71 determines that the CU is a CU subject to predictive coding in the intra-frame prediction mode. Certainly, if the CU is the CU in the non-I frame, the CU determining module 71 may alternatively determine the CU subject to predictive coding in the intra-frame prediction mode in other manners. This is not limited in this embodiment of this application.

It may be understood that if a size of the CU is equal to a size of an SCU, that is, 8*8 pixels, and the CU cannot be further divided, the cost determining module 74 directly determines a first coding cost as a second coding cost of the CU.

The gradient information determining module 72 is configured to determine pixel gradient information corresponding to the CU, the pixel gradient information including a pixel gradient variance, and the pixel gradient variance being a variance of image gradients of at least some pixels in the CU.

In exemplary embodiments, the pixel gradient information corresponding to the CU is information obtained according to an image gradient of a pixel in the CU by the gradient information determining module 72. The pixel gradient information may be information obtained according to image gradients of some or all pixels in the CU by the gradient information determining module 72.

In addition to the pixel gradient variance, the pixel gradient information may further include parameters, for example, a pixel gradient average value and a pixel gradient variance mean variance, used for measuring smoothness and texture complexity of an image. The pixel gradient average value refers to an average value of the image gradients of some or all the pixels in the CU. The pixel gradient mean variance refers to a mean variance of the image gradients of some or all the pixels in the CU.

In exemplary embodiments, the gradient information determining module 72 may determine pixel gradient information of each pixel in the CU by using an image gradient algorithm, so as to determine image gradients of some or all the pixels in the CU, and may further determine the pixel gradient information corresponding to the CU according to the image gradients of some or all the pixels in the CU.

The image gradient algorithm may be an image gradient algorithm based on a first derivative, for example, a Roberts operator, a Sobel operator, or a Prewitt operator. Alternatively, the image gradient algorithm may be an image gradient algorithm based on a second derivative, for example, a Laplace operator.

In exemplary embodiments, if the pixel gradient information is information obtained according to the image gradients of some pixels in the CU, the pixels may be some pixels selected randomly from all the pixels in the CU by the gradient information determining module 72. Alternatively, the pixels may be some pixels selected from all the pixels in the CU by the gradient information determining module 72 according to a specific selecting rule, for example, may be some pixels selected according to a preset sampling rate. For example, the preset sampling rate is 90%, the size of the CU is 64*64 pixels, that is, 4096 pixels, and some pixels in the CU are 3687 pixels in the 4096 pixels. The gradient information determining module 72 may sample all the pixels in the CU from left to right and from top to bottom to obtain the 3687 pixels.

Figure 14:
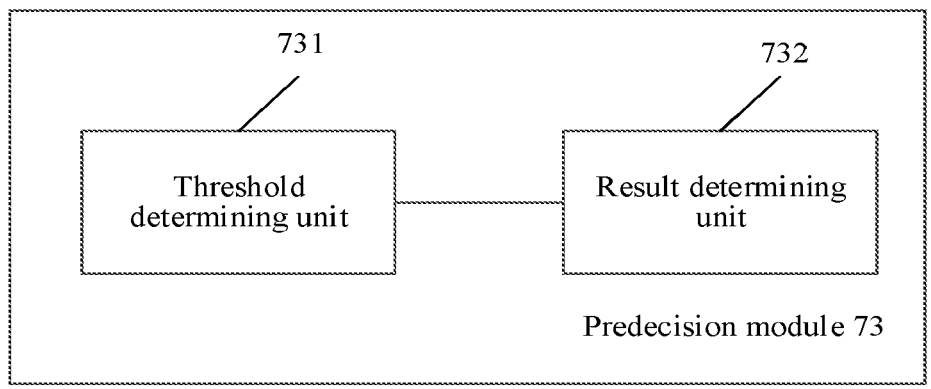
FIG. 14 is a schematic structural diagram of a predecision module according to an exemplary embodiment of the present disclosure.

The predecision module 73 is configured to make a division predecision on the CU according to the pixel gradient information. It may be understood that if the pixel gradient information is the pixel gradient variance, the predecision module 73 may make the division predecision on the CU according to the pixel gradient variance. If the pixel gradient information further includes the pixel gradient average value, the predecision module 73 may make the division predecision on the CU according to the pixel gradient variance and the pixel gradient average value. If the pixel gradient information further includes the pixel gradient mean variance, the predecision module 73 may make the division predecision on the CU according to the pixel gradient variance and the pixel gradient mean variance. Optionally, as shown in FIG. 14, the predecision module 73 may include a threshold determining unit 731 and a result determining unit 732.

In exemplary embodiments, the threshold determining unit 731 is configured to determine a variance threshold corresponding to the CU, and the result determining unit 732 is configured to determine that the result of the division predecision on the CU is negative in a case that the pixel gradient variance is less than the variance threshold, and determine that the result of the division predecision is positive in a case that the pixel gradient variance is greater than or equal to the variance threshold.

In exemplary embodiments, the pixel gradient information further includes the pixel gradient average value. The threshold determining unit 731 is configured to determine a first threshold corresponding to the CU, a second threshold corresponding to the CU, and a variance threshold corresponding to the CU, the second threshold being greater than the first threshold, and the result determining unit 732 is configured to determine that the result of the division predecision on the CU is negative in a case that the pixel gradient average value is less than the first threshold, or determine that the result of the division predecision on the CU is negative in a case that the pixel gradient average value is greater than or equal to the first threshold, the pixel gradient average value is less than the second threshold, and the pixel gradient variance is less than the variance threshold, or determine that the result of the division predecision on the CU is positive in a case that the pixel gradient average value is greater than or equal to the first threshold, the pixel gradient average value is less than the second threshold, and the pixel gradient variance is greater than or equal to the variance threshold, or determine that the result of the division predecision on the CU is positive in a case that the pixel gradient average value is greater than or equal to the second threshold.

In exemplary embodiments, there are two cases for the variance threshold corresponding to the CU. One case is that the variance threshold is a fixed threshold, and the other case is that the variance threshold is in a positive correlation with a quantization parameter corresponding to the CU. That is, a greater quantization parameter corresponding to the CU indicates a greater variance threshold.

The quantization parameter reflects a compression status of space details. If the quantization parameter is small, most of the details are retained. If the quantization parameter is increased, the details are lost, and a bit rate is reduced, that is, the quantization parameter is in a negative correlation with the bit rate and the variance threshold is in a negative correlation with the bit rate. A value of the quantization parameter may be determined by an encoder. A value range of the quantization parameter is 0 to 52. When the quantization parameter is greater than 0, the threshold determining unit 731 may determine a product of the quantization parameter corresponding to the CU and X as the variance threshold corresponding to the CU, and X is greater than or equal to 1, or determine a fixed variance threshold as the variance threshold corresponding to the CU.

In exemplary embodiments, both the first threshold and the second threshold are average thresholds. If the first threshold corresponding to the CU is not 0, the second threshold corresponding to the CU may be a fixed multiple of the first threshold corresponding to the CU. To be specific, the threshold determining unit 731 may determine that the second threshold corresponding to the CU is a product of the first threshold corresponding to the CU and a second coefficient, the second coefficient being greater than 1. If the first threshold corresponding to the CU is 0, the threshold determining unit 731 may determine that the second threshold corresponding to the CU may be a sum of first threshold corresponding to the CU and a target average threshold, the target average threshold being a fixed threshold.

In exemplary embodiments, the first threshold corresponding to the CU may be a fixed threshold. The threshold determining unit 731 may determine an average threshold corresponding to a size of the CU as the first threshold corresponding to the CU. If the first threshold corresponding to the CU is a fixed threshold, the first threshold is in a negative correlation with the size of the CU.

In exemplary embodiments, the first threshold corresponding to the CU may alternatively be correlated with an average value of pixel gradients of CUs near the CU. When determining the first threshold corresponding to the CU, the threshold determining unit 731 may determine a plurality of neighboring CUs of the CU. An edge of the neighboring CU coincides with an edge of the CU or a vertex of the neighboring CU coincides with a vertex of the CU, and an image in the neighboring CU does not coincide with an image in the CU. The threshold determining unit 731 may also determine the first threshold corresponding to the CU according to a size of a first neighboring CU and a pixel gradient average value corresponding to the first neighboring CU in a case that a quantity of first neighboring CUs in the plurality of neighboring CUs is greater than or equal to a target quantity. The first neighboring CU is subject to predictive coding in the intra-frame prediction mode. The threshold determining unit 731 may further determine an average threshold corresponding to a size of the CU as the first threshold corresponding to the CU in a case that the quantity of the first neighboring CU in the plurality of neighboring CUs is less than the target quantity.

In exemplary embodiments, the neighboring CU may be a CU near the CU and connected with the CU. The neighboring CU may be a CU on which predictive coding has been performed. A size of the neighboring CU may be the same as the size of the CU, or may be different from the size of the CU.

The following describes the neighboring CU by using an example. As shown in FIG. 11, if the CU is CU1 shown in FIG. 11, as CU7, CU17, CU19, CU20, and CU23 each have an edge coinciding with an edge of CU1, and CU6, CU10, CU22, and CU24 each have a vertex coinciding with a vertex of CU1, the threshold determining unit 731 determines that the CU6, CU7, CU10, CU17, CU19, CU20, CU22, CU23, and CU24 are all neighboring CUs of CU1, and because remaining CUs have no edge or vertex coinciding with that of CU1, the threshold determining unit 731 determines that the remaining CUs are not neighboring CUs of the CU.

Further, the neighboring CU may alternatively be a CU near the CU and in a specific orientation. For example, the neighboring CUs are neighboring CUs near the CU and located in an upper left orientation, a right above orientation, an upper right orientation, and a right left orientation. In this case, the threshold determining unit 731 determines that CU6, CU7, CU10, CU17, and CU19 are neighboring CUs of CU1.

If the neighboring CU is defined as a CU with the same size as the CU, the threshold determining unit 731 determines the following CUs as neighboring CUs: a CU formed by combining CU3, CU4, CU5, and CU6, CU7, a CU formed by combining CUB, CU9, CU10, and CU11, a CU formed by combining CU16, CU17, CU18, and CU19, CU20, CU22, CU23, and a CU formed by combining CU24, CU25, CU26, and CU27. In exemplary embodiments, the target quantity may be set to 4, 5, 6, or other values. The average threshold corresponding to the size of the CU is a fixed threshold, and a larger size of the CU indicates a smaller average threshold corresponding to the size of the CU. In specific implementation, three average thresholds may be designed to correspond to a CU with a size of 16*16 pixels, a CU with a size of 32*32 pixels, and a CU with a size of 64*64 pixels respectively.

In exemplary embodiments, if the CU is a CU in an I frame, the threshold determining unit 731 determines that all the neighboring CUs are first neighboring CUs. If the CU is a CU in a non-I frame, the threshold determining unit 731 determines first neighboring CUs in the plurality of neighboring CUs by using the CU determining module 71.

In exemplary embodiments, when determining the first threshold corresponding to the CU according to the size of the first neighboring CU and the pixel gradient average value of the first neighboring CU, the threshold determining unit 731 may search the first neighboring CUs for a second neighboring CU, where a size of the second neighboring CU is greater than or equal to the size of the CU, and determine a product of a first coefficient and a target average value as the first threshold corresponding to the CU in a case that there is the second neighboring CU. The target average value is a quotient of a sum of pixel gradient average values of the second neighboring CUs and a quantity of the second neighboring CUs. The threshold determining unit 731 may also determine that the first threshold corresponding to the CU is 0 in a case that there is no second neighboring CU.

For example, in the neighboring CUs shown in FIG. 11, CU7, CU10, CU17, CU20, CU22, and CU23 are all CU subject to predictive coding in the intra-frame prediction mode. As sizes of CU7, CU20, CU22, and CU23 are all equal to the size of CU1, the threshold determining unit 731 determines that CU7, CU20, CU22, and CU23 are all second neighboring CUs.

In exemplary embodiments, the threshold determining unit 731 may determine a pixel gradient average value corresponding to each neighboring CU by using the gradient information determining module 72 and further determine the target average value.

For example, if the second neighboring CUs are a CU 2, a CU 3, a CU 4, and a CU 5, and corresponding pixel gradient average values are a pixel gradient average value 1, a pixel gradient average value 2, a pixel gradient average value 3, and a pixel gradient average value 4 respectively, the threshold determining unit 731 determines that the target average value is (the pixel gradient average value 1+the pixel gradient average value 2+the pixel gradient average value 3+the pixel gradient average value 4)/4. It may be understood that the first threshold being 0 is a minimum value that can be obtained by performing gradient calculation.

Optionally, when determining the first threshold corresponding to the CU, the threshold determining unit 731 may determine a plurality of neighboring CUs of the CU, where an edge of the neighboring CU coincides with an edge of the CU or a vertex of the neighboring CU coincides with a vertex of the CU, and an image in the neighboring CU does not coincide with an image in the CU. The threshold determining unit 731 may also determine the first threshold corresponding to the CU according to a division status of a first neighboring CU and a pixel gradient average value of the first neighboring CU in a case that a quantity of first neighboring CUs in the plurality of neighboring CUs is greater than or equal to a target quantity. The first neighboring CU is a CU subject to predictive coding in an intra-frame prediction mode.

In exemplary embodiments, the threshold determining unit 731 may search the first neighboring CUs for a third neighboring CU, where the third neighboring CU is a first neighboring CU that is not divided. The threshold determining unit 731 may determine a product of a first coefficient and a target average value as the first threshold corresponding to the CU in a case that there is the third neighboring CU. The target average value is a quotient of a sum of pixel gradient average values corresponding to third neighboring CUs and a quantity of the third neighboring CUs.

The cost determining module 74 is configured to determine a first coding cost as a second coding cost of the CU in a case that a result of the division predecision made on the CU by the predecision module 73 is negative. The second coding cost is used for determining a division policy of a CTU corresponding to the CU, and the first coding cost is a coding cost obtained by performing predictive coding on the CU by using a current size of the CU as a size of a PU.

In exemplary embodiments, the first coding cost is a coding cost of the CU in a PU division manner of 2N*2N. If there is only one corresponding prediction mode when the size of the PU is the current size of the CU, the first coding cost is a coding cost obtained by performing predictive coding on the CU in the prediction mode, that is, a coding cost corresponding to the prediction mode. If there is a plurality of corresponding prediction modes when the size of the PU is the current size of the CU, the first coding cost is a minimum coding cost obtained by performing predictive coding on the CU by using the current size of the CU as the size of the PU.

For example, if the size of the CU is 32*32 pixels, and there is only a prediction mode 1 corresponding to the PU with the size of 32*32 pixels, the first coding cost is a coding cost obtained by performing predictive coding on the CU in the prediction mode 1. If there are four prediction modes corresponding to the PU with the size being 32*32 pixels: a prediction mode 1, a prediction mode 2, a prediction mode 3, and a prediction mode 4, the cost determining module 74 determines that coding costs obtained by performing predictive coding on the CU in the four prediction modes are c11, c12, c13, and c14 respectively, and c11<c12<c13<c14, the cost determining module 74 determines that the first coding cost is c11.

In exemplary embodiments, the second coding cost refers to a final coding cost of the CU. If the CU is a CTU, a second coding cost of the CTU may be equivalent to the minimum coding cost (c0) of the CTU determined after the recursion process in the processes shown in FIG. 3E. Because the second coding cost is the first coding cost, it may be determined that a division policy of the CTU is negative according to the description of determining a division policy according to the minimum coding cost of the CTU, that is, coding is directly performed by using the current size of the CTU. If the CU is neither the CTU nor the CU of the fourth layer, the second coding cost of the CU may be equivalent to the minimum coding cost (c21, c31, and the like) of the CU determined by comparing the minimum coding cost of the CU in the PU division manner of 2N*2N with the minimum coding cost of the CU in the PU division manner of N*N in the processes shown in FIG. 3C or FIG. 3D. The second coding cost is used for calculating a minimum coding cost of a CU of an upper layer of the CU in the PU division manner of N*N, a second coding cost of the CTU may be determined through recursion, and then a division policy of the CTU is determined.

In exemplary embodiments, after a CU is determined to be subject to predictive coding in an intra-frame prediction mode, pixel gradient information of the CU is determined, and a division predecision is made on the CU according to the pixel gradient information of the CU. When a result of the division predecision is negative, a coding cost obtained by performing predictive coding on the CU by using a current size of the CU as a size of a PU is determined as a final coding cost of the CU. Further, it may be determined that the CU does not need to be divided, and division of the CU is ended in advance. A process of dividing the CU into sub-CUs, performing predictive coding on the sub-CUs as new CUs, and calculating coding costs is avoided, thereby reducing calculation workload and improving a coding rate.

Figure 15:
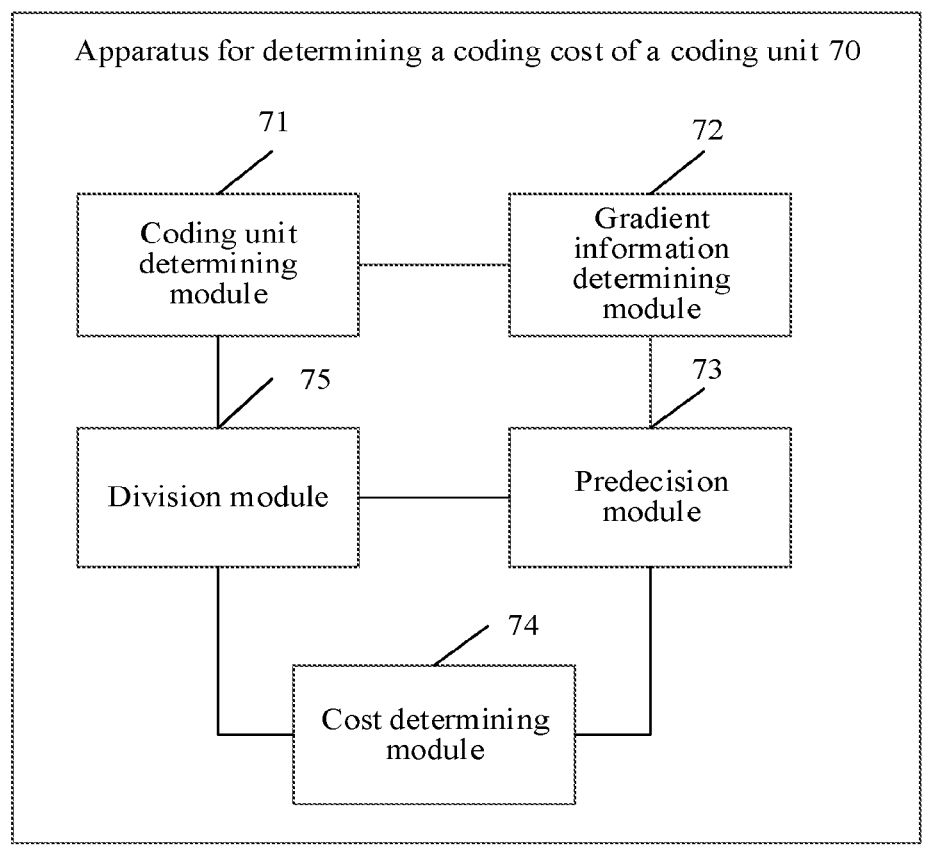
FIG. 15 is a schematic structural diagram of an apparatus for determining a coding cost of a CU according to an exemplary embodiment of the present disclosure.

FIG. 15 is a schematic structural diagram of an apparatus for determining a coding cost of a CU according to an embodiment of this application. The apparatus may include the CU determining module 71, the gradient information determining module 72, the predecision module 73, and the cost determining module 74 in the embodiment corresponding to FIG. 13, and the apparatus may further include a division module 75.

The division module 75 is configured to divide the CU into at least two sub-CUs in a case that the result of the division predecision made on the CU by the predecision module is positive.

In exemplary embodiments, the division module 75 may divide the CU into four sub-CUs with reference to a full quadtree manner in the related art. Certainly, the division module 75 may alternatively divide the CU into another quantity of sub-CUs. This is not limited in this embodiment of this application.

The CU determining module 71 is further configured to use each of the at least two sub-CUs as a new CU subject to predictive coding in the intra-frame prediction mode, the gradient information determining module 72 is further configured to determine pixel gradient information corresponding to each of the at least two sub-CUs, the predecision module 73 is further configured to make a division predecision on each of the at least two sub-CUs according to the pixel gradient information, and the cost determining module 74 is further configured to determine a coding cost of each of the at least two sub-CUs.

In exemplary embodiments, the gradient information determining module 72 may determine pixel gradient information corresponding to each of the at least two sub-CUs in the manner of determining the pixel gradient information corresponding to the CU, the predecision module 73 may make a division predecision on each of the at least two sub-CUs in the manner of making the division predecision on the CU according to the pixel gradient information corresponding to the CU, and the cost determining module 74 may determine a coding cost of each of the at least two sub-CUs in the manner of determining the coding cost of the CU. Specifically, reference may be made to related description in the embodiment corresponding to FIG. 13.

The cost determining module 74 is further configured to determine the first coding cost as the second coding cost of the CU in a case that a sum of coding costs of the at least two sub-CUs is greater than or equal to the first coding cost.

The cost determining module 74 is further configured to determine the sum of the coding costs of the at least two sub-CUs as the second coding cost of the CU in a case that the sum of the coding costs of the at least two sub-CUs is less than the first coding cost.

In exemplary embodiments, after a CU is determined to be subject to predictive coding in an intra-frame prediction mode, pixel gradient information of the CU is determined, and a division predecision is made on the CU according to the pixel gradient information of the CU. When a result of the division predecision is negative, a coding cost obtained by performing predictive coding on the CU by using a current size of the CU as a size of a PU is determined as a final coding cost of the CU. Further, it may be determined that the CU does not need to be divided, and division of the CU is ended in advance. Only when the result of the division predecision is positive, the CU is divided, and then a sum of coding costs of sub-CUs corresponding to the CU is compared with a first coding cost. Because the same method for determining a coding cost is adopted for determining the coding costs of the sub-CUs, further division of a sub-CU may be ended in advance. Division of the CU is ended as early as possible, so that a large quantity of processes of calculating a coding cost is avoided, thereby reducing calculation workload, determining a division policy of a CTU as soon as possible, and improving a coding speed.

Figure 16:
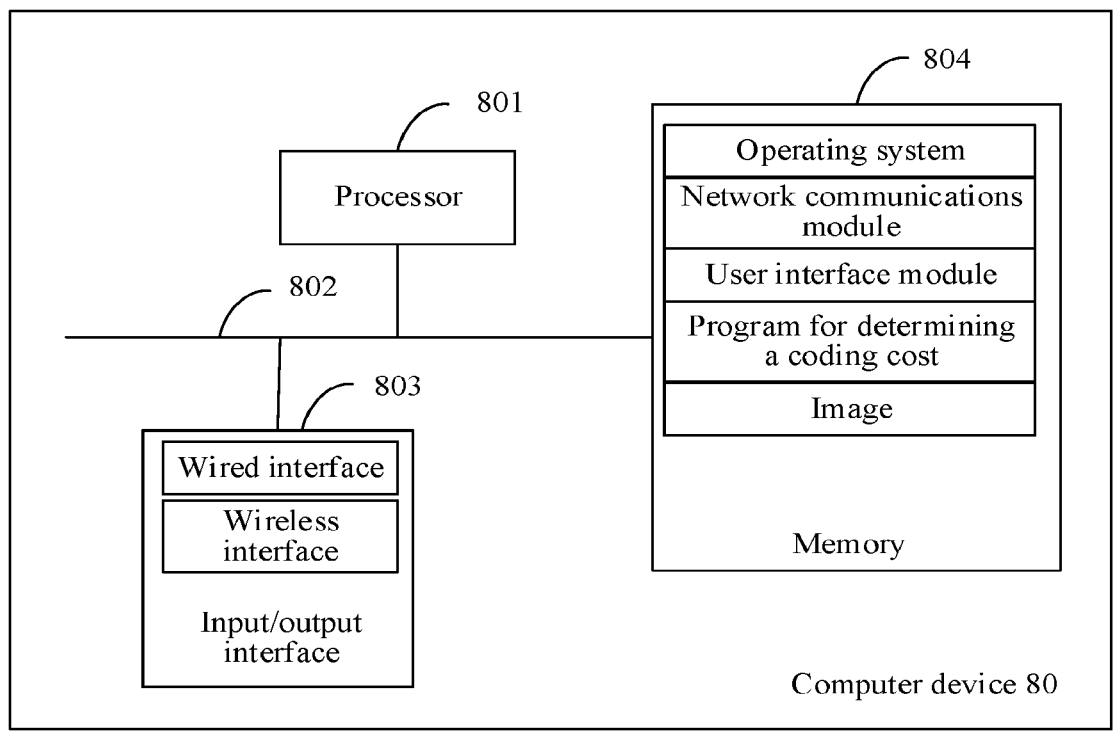
FIG. 16 is a schematic structural diagram of a computer device according to an exemplary embodiment of the present disclosure.

FIG. 16 is a schematic structural diagram of a computer device according to an exemplary embodiment of the present disclosure. As shown in FIG. 16, the computer device 80 may include circuitry such as at least one processor 801, for example, a CPU, an input/output interface 803, a memory 804, and at least one communications bus 802. The communications bus 802 is configured to implement connection and communication between these components. The input/output interface 803 may include a standard wired interface (for example, a USB interface) and a standard wireless interface (for example, a Wi-Fi interface). Optionally, the input/output interface 803 may include a user interface (for example, a display, a keyboard, and a mouse). The memory 804 may be a high-speed random access memory (RAM), or may be a non-volatile memory, for example, at least one magnetic disk storage apparatus. Optionally, the memory 804 may alternatively be at least one storage apparatus that is located far away from the processor 801. As shown in FIG. 16, the memory 804, which is used as a computer storage medium, may include an operating system, a network communications module, a user interface module, a program for determining a coding cost, and an image.

In the computer device 80 shown in FIG. 16, the input/output interface 803 is configured to obtain an image and send the image to the computer device. Optionally, the input/output interface 803 may be further configured to output the image processed by the processor. The processor 801 may divide the image to obtain a CU.

Specifically, the processor 801 may be configured to invoke the program for determining a coding cost stored in the memory 804 to specifically perform the following operations in which a CU subject to predictive coding in an intra-frame prediction mode is determined. Pixel gradient information corresponding to the CU is determined. The pixel gradient information includes a pixel gradient variance, and the pixel gradient variance is a variance of image gradients of at least some pixels in the CU. A division predecision on the CU is made according to the pixel gradient information, and a first coding cost is determined as a second coding cost of the CU in a case that a result of the division predecision on the CU is negative. The second CU is used for determining a division policy of a CTU corresponding to the CU, and the first coding cost is a coding cost obtained by performing predictive coding on the CU by using a current size of the CU as a size of a PU.

In an exemplary embodiment, the processor 801 may be further configured to invoke the program for determining a coding cost stored in the memory 804, to perform the following operations, in which the CU is divided into at least two sub-CUs in a case that the result of the division predecision on the CU is positive, and, by using each of the at least two sub-CUs as a new CU subject to predictive coding in the intra-frame prediction mode, the method for determining a coding cost of a CU is performed to determine a coding cost of each of the at least two sub-CUs. The first coding cost is determined as the second coding cost of the CU in a case that a sum of coding costs of the at least two sub-CUs is greater than or equal to the first coding cost, and the sum of the coding costs of the at least two sub-CUs is determined as the second coding cost of the CU in a case that the sum of the coding costs of the at least two sub-CUs is less than the first coding cost.

In exemplary embodiment, when making the division predecision on the CU according to the pixel gradient information, the processor 801 specifically performs the following operations, in which a variance threshold corresponding to the CU is determined, and the result of the division predecision on the CU is determined to be negative in a case that the pixel gradient variance is less than the variance threshold. The result of the division predecision on the CU is determined to be positive in a case that the pixel gradient variance is greater than or equal to the variance threshold.

In an exemplary embodiment, the pixel gradient information further includes a pixel Gradient average value, and the pixel gradient average value is an average value of the image gradients of the at least some pixels in the CU. When making the division predecision on the CU according to the pixel gradient information, the processor 801 specifically performs the following operations, in which a first threshold corresponding to the CU, a second threshold corresponding to the CU, and a variance threshold corresponding to the CU are determined, where the second threshold being greater than the first threshold. the result of the division predecision on the CU is determined to be negative in a case that the pixel gradient average value is less than the first threshold, or the result of the division predecision on the CU is determined to be negative in a case that the pixel gradient average value is greater than or equal to the first threshold. The pixel gradient average value is less than the second threshold, and the pixel gradient variance is less than variance threshold. The result of the division predecision on the CU is determined to be positive in a case that the pixel gradient average value is greater than or equal to the first threshold, the pixel gradient average value is less than the second threshold, and the pixel gradient variance is greater than or equal to the variance threshold, or the result of the division predecision on the CU is determined to be positive in a case that the pixel gradient average value is greater than or equal to the second threshold.

In exemplary embodiment, when determining the first threshold corresponding to the CU, the processor 801 specifically performs the following operations, in which a plurality of neighboring CUs of the CU is determined. An edge of the neighboring CU coincides with an edge of the CU or a vertex of the neighboring CU coincides with a vertex of the CU, and an image in the neighboring CU does not coincide with an image in the CU. The first threshold corresponding to the CU is determined according to a size of a first neighboring CU and a pixel gradient average value corresponding to the first neighboring CU in a case that a quantity of first neighboring CUs in the plurality of neighboring CUs is greater than or equal to a target quantity. The first neighboring CU is subject to predictive coding in the intra-frame prediction mode. An average threshold corresponding to a size of the CU is determined as the first threshold corresponding to the CU in a case that the quantity of the first neighboring CUs in the plurality of neighboring CUs is less than the target quantity.

In an exemplary embodiment, when determining the first threshold corresponding to the CU according to the size of the first neighboring CU and the pixel gradient average value corresponding to the first neighboring CU, the processor 801 specifically performs the following operations, in which the first neighboring CUs is searched for a second neighboring CU, where a size of the second neighboring CU being greater than or equal to the size of the CU. A product of a first coefficient and a target average value is determined as the first threshold corresponding to the CU in a case that there is the second neighboring CU. The target average value is a quotient of a sum of pixel gradient average values of second neighboring CUs and a quantity of the second neighboring CUs. The first threshold corresponding to the CU is determined to be 0 in a case that there is no second neighboring CU.

In an exemplary embodiment, the second threshold corresponding to the CU is a product of the first threshold corresponding to the CU and a second coefficient. In an exemplary embodiment, the variance threshold corresponding to the CU is in a positive correlation with a quantization parameter corresponding to the CU.

In an exemplary embodiment, after a CU is determined to be subject to predictive coding in an intra-frame prediction mode, pixel gradient information of the CU is determined, and a division predecision is made on the CU according to the pixel gradient information of the CU. When a result of the division predecision is negative, a coding cost obtained by performing predictive coding on the CU by using a current size of the CU as a size of a PU is determined as a final coding cost of the CU. Further, it may be determined that the CU does not need to be divided, and division of the CU is ended in advance. Only when the result of the division predecision is positive, the CU is divided, and then a sum of coding costs of sub-CUs corresponding to the CU is compared with a first coding cost. Because the same method for determining a coding cost is adopted for determining the coding costs of the sub-CUs, further division of a sub-CU may be ended in advance. Division of the CU is ended as early as possible, so that a large quantity of processes of calculating a coding cost is avoided, thereby reducing calculation workload, determining a division policy of a CTU as soon as possible, and improving a coding speed.

A person of ordinary skill will recognize that all or some of the processes of the methods in the exemplary embodiments may be implemented by a computer program instructing relevant hardware. The program may be stored in a non-transitory computer-readable storage medium. When the program runs, the processes of the methods in the embodiments are performed. The non-transitory storage medium may be: a magnetic disk, an optical disc, a read-only memory (ROM), a RAM, or the like.

The above descriptions are merely exemplary embodiments of the present disclosure, and therefore not limiting upon the present disclosure. Therefore, equivalent variations may be made in accordance with the claims without departing from the scope of the present disclosure.

What is claimed is:

1. A method for determining a coding cost of a coding unit (CU), performed by a server, the method comprising:
    determining, with circuitry of the server, a CU subject to predictive coding in an intra-frame prediction mode;
    determining, with the circuitry of the server, pixel gradient information corresponding to the CU, the pixel gradient information including a pixel gradient variance, and the pixel gradient variance being a variance of image gradients of at least some pixels in the CU;
    making, with the circuitry of the server, a division predecision on the CU according to the pixel gradient information; and
    determining, with the circuitry of the server, a first coding cost as a second coding cost of the CU in a case that a result of the division predecision on the CU is negative, the second CU being used for determining a division policy of a coding tree unit (CTU) corresponding to the CU, and the first coding cost being a coding cost obtained by performing predictive coding on the CU by using a current size of the CU as a size of a prediction unit (PU).

2. The method according to claim 1, further comprising:
    dividing the CU into at least two sub-CUs in a case that the result of the division predecision on the CU is positive;
    performing, by using each of the at least two sub-CUs as a new CU subject to predictive coding in the intra-frame prediction mode, the determining of the coding cost of a CU, to determine a coding cost of each of the at least two sub-CUs;
    determining the first coding cost as the second coding cost of the CU in a case that a sum of coding costs of the at least two sub-CUs is greater than or equal to the first coding cost; and
    determining the sum of the coding costs of the at least two sub-CUs as the second coding cost of the CU in a case that the sum of the coding costs of the at least two sub-CUs is less than the first coding cost.

3. The method according to claim 1, wherein the making of the division predecision comprises:
    determining a variance threshold corresponding to the CU;
    determining that the result of the division predecision on the CU is negative in a case that the pixel gradient variance is less than the variance threshold; and
    determining that the result of the division predecision on the CU is positive in a case that the pixel gradient variance is greater than or equal to the variance threshold.

4. The method according to claim 1, wherein the pixel gradient information further comprises a pixel gradient average value, and the pixel gradient average value is an average value of the image gradients of the at least some pixels in the CU; and
    the making of the division predecision on the CU comprises:
    determining a first threshold corresponding to the CU, a second threshold corresponding to the CU, and a variance threshold corresponding to the CU, the second threshold being greater than the first threshold; and
    determining that the result of the division predecision on the CU is negative in a case that the pixel gradient average value is less than the first threshold, or determining that the result of the division predecision on the CU is negative in a case that the pixel gradient average value is greater than or equal to the first threshold, the pixel gradient average value is less than the second threshold, and the pixel gradient variance is less than the variance threshold, or
    determining that the result of the division predecision on the CU is positive in a case that the pixel gradient average value is greater than or equal to the first threshold, the pixel gradient average value is less than the second threshold, and the pixel gradient variance is greater than or equal to the variance threshold, or determining that the result of the division predecision on the CU is positive in a case that the pixel gradient average value is greater than or equal to the second threshold.

5. The method according to claim 4, wherein the determining of the first threshold comprises:
    determining a plurality of neighboring CUs of the CU, an edge of a neighboring CU coinciding with an edge of the CU or a vertex of the neighboring CU coinciding with a vertex of the CU, and an image in the neighboring CU being not coinciding with an image in the CU;
    determining the first threshold corresponding to the CU according to a size of a first neighboring CU and a pixel gradient average value corresponding to the first neighboring CU in a case that a quantity of first neighboring CUs in the plurality of neighboring CUs is greater than or equal to a target quantity, the first neighboring CU being subject to predictive coding in the intra-frame prediction mode; and determining an average threshold corresponding to a size of the CU as the first threshold corresponding to the CU in a case that the quantity of the first neighboring CUs in the plurality of neighboring CUs is less than the target quantity.

6. The method according to claim 5, wherein the determining the first threshold corresponding to the CU according to a size of a first neighboring CU and a pixel gradient average value corresponding to the first neighboring CU comprises:

searching the first neighboring CUs for a second neighboring CU, a size of the second neighboring CU being greater than or equal to the size of the CU;

determining a product of a first coefficient and a target average value as the first threshold corresponding to the CU in a case that there is the second neighboring CU, the target average value being a quotient of a sum of pixel gradient average values of second neighboring CUs and a quantity of the second neighboring CUs; and determining that the first threshold corresponding to the CU is 0 in a case that there is no second neighboring CU.

7. The method according to claim 4, wherein the second threshold corresponding to the CU is a product of the first threshold corresponding to the CU and a second coefficient.

8. The method according to claim 3, wherein the variance threshold corresponding to the CU is in a positive correlation with a quantization parameter corresponding to the CU.

9. An apparatus for determining a coding cost of a coding unit (CU), comprising:

circuitry configured to determine a CU subject to predictive coding in an intra-frame prediction mode;

determine pixel gradient information corresponding to the CU, the pixel gradient information comprising a pixel gradient variance, and the pixel gradient variance being a variance of image gradients of at least some pixels in the CU;

make a division predecision on the CU according to the pixel gradient information; and determine a first coding cost as a second coding cost of the CU in a case that a result of the division predecision made on the CU by the predecision module is negative, the second coding cost being used for determining a division policy of a coding tree unit (CTU) corresponding to the CU, and the first coding cost being a coding cost obtained by performing predictive coding on the CU by using a current size of the CU as a size of a prediction unit (PU).

10. The apparatus according to claim 9, wherein the circuitry is further configured to:

divide the CU into at least two sub-CUs in a case that the result of the division predecision made on the CU by the predecision module is positive;

use each of the at least two sub-CUs as a new CU subject to predictive coding in the intra-frame prediction mode, determine pixel gradient information corresponding to each of the at least two sub-CUs, make a division predecision on each of the at least two sub-CUs according to the pixel gradient information, and determine a coding cost of each of the at least two sub-CUs;

determine the first coding cost as the second coding cost of the CU in a case that a sum of coding costs of the at least two sub-CUs is greater than or equal to the first coding cost; and determine the sum of the coding costs of the at least two sub-CUs as the second coding cost of the CU in a case that the sum of the coding costs of the at least two sub-CUs is less than the first coding cost.

11. The apparatus according to claim 9, wherein the circuitry is further configured to:

determine a variance threshold corresponding to the CU;

determine that the result of the division predecision on the CU is negative in a case that the pixel gradient variance is less than the variance threshold; and determine that the result of the division predecision on the CU is positive in a case that the pixel gradient variance is greater than or equal to the variance threshold.

12. The apparatus according to claim 9, wherein the pixel gradient information further comprises a pixel gradient average value, and the pixel gradient average value is an average value of the image gradients of the at least some pixels in the CU; and the circuitry is further configured to:

determine a first threshold corresponding to the CU, a second threshold corresponding to the CU, and a variance threshold corresponding to the CU, the second threshold being greater than the first threshold.

13. The apparatus according to claim 12, wherein the circuitry is further configured to determine that a result of the division predecision on the CU is negative in a case that the pixel gradient average value is less than the first threshold.

14. The apparatus according to claim 12, wherein the circuitry is further configured to determine that a result of the division predecision on the CU is negative in a case that the pixel gradient average value is greater than or equal to the first threshold, the pixel gradient average value is less than the second threshold, and the pixel gradient variance is less than the variance threshold.

15. The apparatus according to claim 12, wherein the circuitry is further configured to determine that the result of the division predecision on the CU is positive in a case that the pixel gradient average value is greater than or equal to the first threshold, the pixel gradient average value is less than the second threshold, and the pixel gradient variance is greater than or equal to the variance threshold.

16. The apparatus according to claim 12, wherein the circuitry is further configured to determine that the result of the division predecision on the CU is positive in a case that the pixel gradient average value is greater than or equal to the second threshold.

17. The apparatus according to claim 12, wherein the circuitry is further configured to:

determine a plurality of neighboring CUs of the CU, an edge of a neighboring CU coinciding with an edge of the CU or a vertex of the neighboring CU coinciding with a vertex of the CU, and an image in the neighboring CU being not coinciding with an image in the CU;

determine the first threshold corresponding to the CU according to a size of a first neighboring CU and a pixel gradient average value corresponding to the first neighboring CU in a case that a quantity of first neighboring CUs in the plurality of neighboring CUs is greater than or equal to a target quantity, the first neighboring CU being subject to predictive coding in the intra-frame prediction mode; and determine an average threshold corresponding to a size of the CU as the first threshold corresponding to the CU in a case that the quantity of the first neighboring CUs in the plurality of neighboring CUs is less than the target quantity.

18. A non-transitory computer-readable medium encoded with computer-readable instructions that, when executed by a processor, cause the processor to perform a method comprising:
   determining a coding unit (CU) subject to predictive coding in an intra-frame prediction mode;
   determining pixel gradient information corresponding to the CU, the pixel gradient information comprising a pixel gradient variance, and the pixel gradient variance being a variance of image gradients of at least some pixels in the CU;
   making a division predecision on the CU according to the pixel gradient information; and
   determining a first coding cost as a second coding cost of the CU in a case that a result of the division predecision on the CU is negative, the second CU being used for determining a division policy of a coding tree unit (CTU) corresponding to the CU, and the first coding cost being a coding cost obtained by performing predictive coding on the CU by using a current size of the CU as a size of a prediction unit (PU).

19. The non-transitory computer-readable medium according to claim 18, wherein the method further comprises:
   dividing the CU into at least two sub-CUs in a case that the result of the division predecision on the CU is positive;
   performing, by using each of the at least two sub-CUs as a new CU subject to predictive coding in the intra-frame prediction mode, the determining of the coding cost of a CU to determine a coding cost of each of the at least two sub-CUs;
   determining the first coding cost as the second coding cost of the CU in a case that a sum of coding costs of the at least two sub-CUs is greater than or equal to the first coding cost; and
   determining the sum of the coding costs of the at least two sub-CUs as the second coding cost of the CU in a case that the sum of the coding costs of the at least two sub-CUs is less than the first coding cost.

20. The non-transitory computer-readable medium according to claim 18, wherein, in making the division predecision, the method further comprises:
   determining a variance threshold corresponding to the CU;
   determining that the result of the division predecision on the CU is negative in a case that the pixel gradient variance is less than the variance threshold; and
   determining that the result of the division predecision on the CU is positive in a case that the pixel gradient variance is greater than or equal to the variance threshold.

* * * * *